US012663272B1

(12) United States Patent
Nightingale

(10) Patent No.: US 12,663,272 B1
(45) Date of Patent: Jun. 23, 2026

(54) DISTRIBUTED VEHICLE ROUTE PLANNING

(71) Applicant: Zoox, Inc., Foster City, CA (US)

(72) Inventor: Reed Berney Nightingale, Seattle, WA (US)

(73) Assignee: Zoox, Inc., Foster City, CA (US)

( * ) Notice: Subject to any disclaimer, the term of this patent is extended or adjusted under 35 U.S.C. 154(b) by 236 days.

(21) Appl. No.: 18/196,622

(22) Filed: May 12, 2023

(51) Int. Cl.
G01C 21/00 (2006.01)
G01C 21/34 (2006.01)

(52) U.S. Cl.
CPC ..... G01C 21/3438 (2013.01); G01C 21/3461 (2013.01)

(58) Field of Classification Search
CPC ........................ G01C 21/3438; G01C 21/3461
See application file for complete search history.

(56) References Cited

U.S. PATENT DOCUMENTS

| | | | |
|---|---|---|---|
| 8,825,395 B2 * | 9/2014 | Boss ................ | G08G 1/096866 705/14.1 |
| 2016/0300186 A1 * | 10/2016 | Scharaswak ....... | G06Q 10/0835 |
| 2022/0253074 A1 * | 8/2022 | Williams ............. | G05D 1/0088 |

* cited by examiner

Primary Examiner — Adnan M Mirza
(74) Attorney, Agent, or Firm — Lee & Hayes, P.C.

(57) ABSTRACT

Techniques are described for controlling and/or influencing the routes driven by vehicles in a fleet of vehicles managed by a fleet routing system. The fleet routing system may determine route data for vehicles to perform requested driving trips based on the current and previous driving trips performed by the fleet. For example, the fleet routing system may evaluate the current driving trips being performed by the fleet to determine modified destinations for driving trip requests. The fleet routing system also may modify various route data, map data, traffic data, and the like, including determining additional waypoints, restricted driving regions, and/or distributed driving regions, to influence the vehicles in the fleet to determine driving routes to prevent congestion on roads and at crowded pullover locations, and to improve vehicle safety, efficiency, and traffic distribution.

18 Claims, 9 Drawing Sheets

300

WAYPOINT 512

MODIFIED DRIVING ROUTE 510

504

506

508

DESTINATION 506

DRIVING ROUTE 504

VEHICLE 502

500

600

RECEIVE DRIVING TRIP REQUEST
602

DETERMINE VEHICLE AND ROUTE DATA BASED ON REQUEST
604

RETRIEVE CURRENT AND/OR PREVIOUS DRIVING TRIP DATA AND
PERFORM HEURISTICS BASED ON ROUTE DATA
606

MODIFY
ROUTE DATA?
608

YES

NO

DETERMINE MODIFIED
ROUTE DATA BASED
ON HEURISTICS 610

TRANSMIT ROUTE DATA TO VEHICLE
612

UPDATE CURRENT AND/OR PREVIOUS DRIVING TRIP DATA
BASED ON ROUTE DATA
614

DISTRIBUTED VEHICLE ROUTE PLANNING

BACKGROUND

Vehicles, autonomous or otherwise, may utilize route planning techniques to determine driving routes from their current locations to desired destinations in an environment. For fleets of associated vehicles, such route planning techniques can be performed independently by the vehicles themselves and/or by off-vehicle fleet routing services configured to determine and provide driving routes to the vehicles in the fleet. In either case, determining safe and efficient driving routes for vehicles to reach their destinations may present challenges, especially when navigating the vehicles through complex, congested, and dynamic driving environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
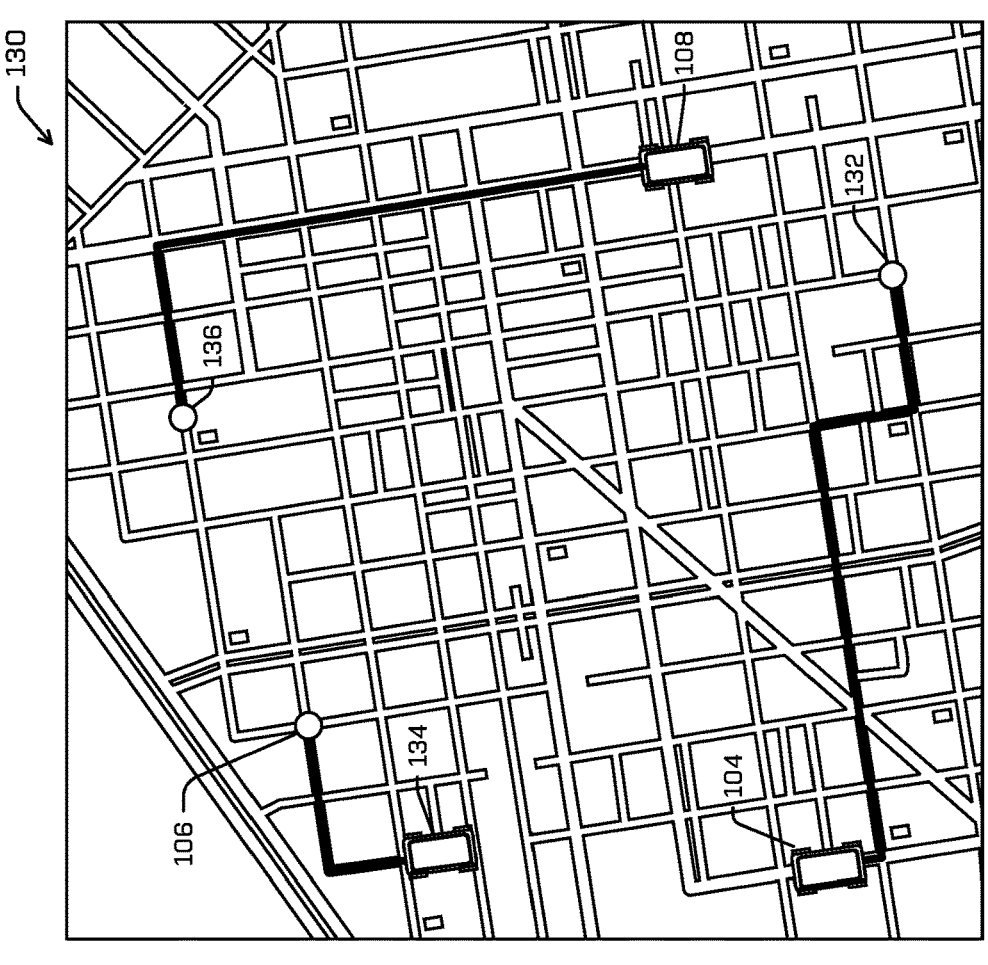
FIG. 1 illustrates an example computing environment including a number of autonomous vehicles being managed by a fleet routing system, in accordance with one or more examples of the disclosure.
Figure 1:
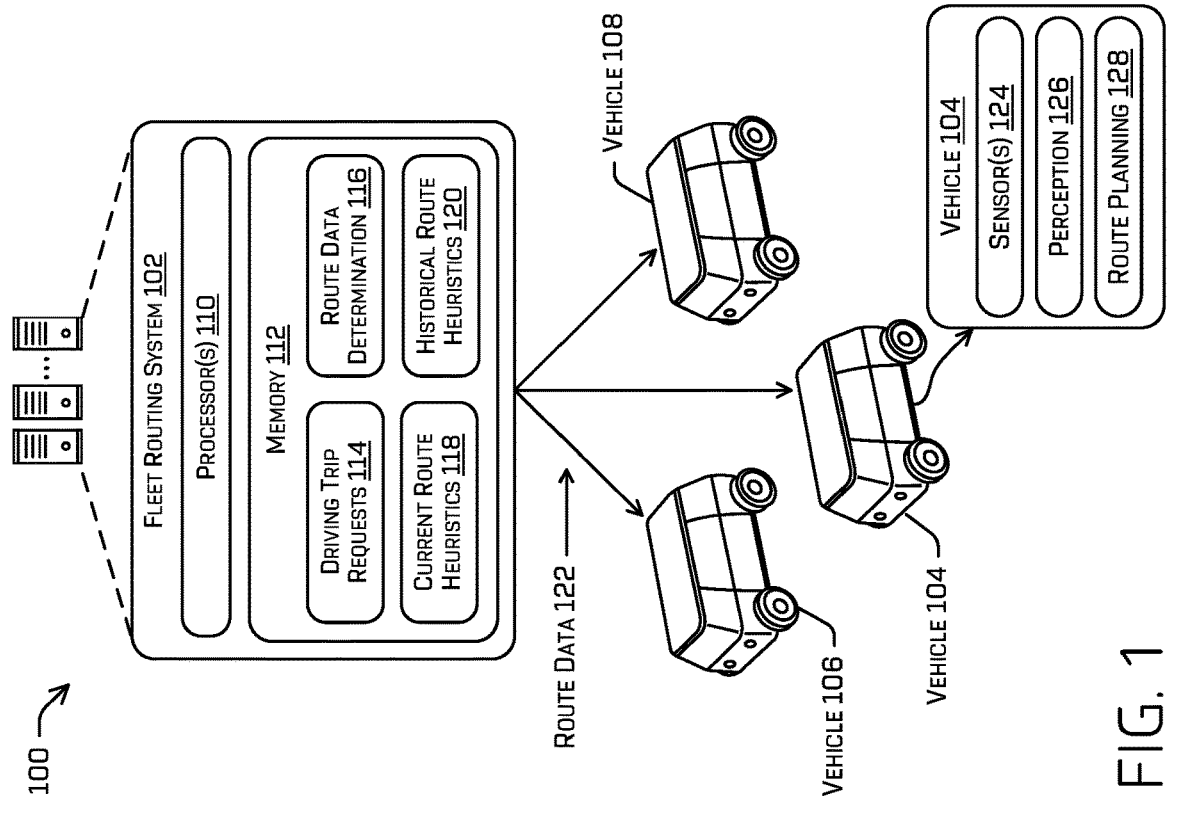

The techniques described herein relate to controlling and/or influencing the routes driven by vehicles, autonomous or otherwise, in a fleet of vehicles managed by a fleet routing system. In various examples, the fleet routing system may determine route data for vehicles in the fleet to perform requested driving trips, based on the driving trips currently being performed by or planned for other vehicles in the fleet, and/or historical driving routes and patterns of the fleet. For instance, the fleet routing system may evaluate the current driving trips being performed by the fleet to determine a modified destination for a driving trip request. Additionally or alternatively, the fleet routing system may modify the route data, map data, traffic data, etc., provided to the vehicles, including providing additional waypoints, restricted driving regions, and/or distributed driving regions to influence the driving routes that the vehicles will determine to perform the requested driving trips. As discussed throughout this disclosure, these techniques may improve vehicle safety and efficiency, for example, by preventing congestion on heavily trafficked roads and at crowded pick-up and drop-off locations, and by increasing driving route variation and traffic distribution when programmatic planning operations are performed independently by the vehicles in the fleet.

In the various examples described herein, vehicle fleets may include fleets of autonomous, semi-autonomous, and/or manually-controlled vehicles used for transporting passengers, delivering physical items or services, or performing various other coordinated driving trips in an environment. A fleet routing system (which also may be referred to as a fleet management system) may receive driving trip requests, such as ride-hailing requests from users, item delivery requests from carriers or recipients, and/or other transportation requests. Based on a driving trip request, the fleet routing system may select a vehicle (or multiple vehicles) in the fleet to handle the request, and then may transmit route data representing the trip request to the selected vehicle(s). The route data provided to a vehicle may include one or more destinations for the driving trip (e.g., a pick-up location, drop-off location, intermediate waypoint locations, etc.), as well as additional trip data such as requested pick-up or drop-off times, passenger or item information, and/or other transportation details related to the trip request. Vehicles selected to handle driving trips also may receive, either from the fleet routing system or from other data sources, additional data such as map data, current traffic conditions, weather data, data identifying locations of accidents, construction zones, etc. Using the route data for the trip request, along with the additional map data, traffic data, etc., the vehicle may use internal route planning components to determine an optimal driving route from its current location to perform the driving trip request.

Certain examples herein relate to techniques in which a fleet routing system determines and provides route data to vehicles for requested driving trips (e.g., pick-up and drop-off locations, times, etc.), after which the vehicles may independently determine their own driving routes through the environment based on the route data. However, the techniques described herein for determining and modifying route data for driving trips can be applied similarly or identically in other implementations, such as examples in which the fleet routing system determines and transmits the actual driving routes to the vehicles (e.g., turn-by-turn instructions, not just route data with pick-up and drop-off locations). The techniques described herein for determining and modifying route data for driving trips can additionally or alternatively be applied in implementations where the functionality of the fleet routing system is incorporated into the individual vehicles of the fleet, for example, where vehicles directly receive driving trip requests, determine route data, etc.

In some systems for routing fleets of vehicles, the routing performed by the centralized routing systems and/or the individual vehicles in the fleet can lead to inefficient and potentially unsafe driving routes. For example, when a large number of trip requests are received for the same (or a nearby) destination at around the same time, a centralized routing system may respond by sending many vehicles in a fleet to the same destination and/or the same driving route. Such situations may occur at large venues at the beginning or ending of an event (e.g., concerts, conventions, sporting events, etc.), or at transportation terminals or hubs when large numbers of passengers are arriving or departing (e.g., airports, ferry terminals, train stations, etc.). In these situations, routing systems for ride-hailing vehicle fleets can cause congestion and/or overcrowding at pullover locations by sending large numbers of vehicles in the fleet to the same pick-up or drop-off destination at or around the same time. Further, when the vehicles in the fleet use similar or identical programmatic components to determine their driving routes, the vehicles may tend to select the same driving paths to and from the pullover locations, which can cause additional congestion along these driving paths.

Additionally, when vehicle fleets are used to perform repeating or routine driving trips in the same area (e.g., frequent trips between the same two locations), the programmatic route-planning components on the vehicle often may select the same driving route for every trip, even when similar alternative routes are available. In such situations, the uniformity of the programmatic route-planning on each vehicle of the fleet can contribute to road congestion along the selected route, and also may nuisance the homes or businesses along the route. This route planning uniformity also may provide disadvantages to the fleet as a whole, for example, with respect to collecting driving environment data, evaluating different routes, improving fleet visibility, and the like.

To address these technical problems and inefficiencies, the techniques described herein may include using the current driving trips being performed by the fleet, as well as previous/historic driving trips and patterns of the fleet, to modify the route data (and/or map data, traffic data, etc.) provided to the vehicles for performing a requested driving trip. In various examples, the fleet routing system may apply heuristics and/or other techniques based on the current and/or previous driving trips performed by the fleet, to determine modified route data to provide to a vehicle to perform a requested driving trip. For instance, in some cases, the fleet routing system may determine a modified destination for a requested driving trip, based on the number of other vehicles in the fleet that have been routed to the same destination during an overlapping time period. When determining modified destinations, the fleet routing system may use heuristics to intentionally distribute fleet traffic to different roads and/or different pullover locations at or near a crowded destination, thereby avoiding congestion and pick-up/drop-off delays at the destination. In some examples, when modifying a destination within the route data provided to a vehicle, the routing system also may communicate or coordinate with the user (or other client system) that requested the driving trip. For instance, the fleet routing system may provide a user with an option of receiving a pick-up or drop-off at a preferred destination with an estimated time delay based on overcrowding and congestion at the preferred destination, or another option of receiving the pick-up or drop-off at an alternative location nearby with a reduced time delay (or no delay). Additionally or alternatively, a cost associated with the requested driving trip may vary based on the determined crowd or congestion at a requested destination. For instance, a user requesting the trip may be charged more for a pick-up or drop-off at a full or congested destination, and less at a less crowded alternative destination.

Additionally or alternatively, the fleet routing system may modify the route data (and/or map data, traffic data, etc.) provided to the vehicles in the fleet to control or influence the vehicles to select alternative driving routes and/or alternative pullover locations. In some examples, the fleet routing system may determine additional waypoints and/or restricted driving regions, which may be included in the route data provided to the vehicle performing a requested driving trip. Waypoints, which can be included in the route data provided to vehicles, may represent locations that the vehicle is instructed to drive to as part of a driving trip. As non-limiting examples, waypoints may include streets, intersections, global positioning system (GPS) coordinates, etc. The route data for a driving trip may include a starting waypoint, an ending waypoint, and/or any number of optional intermediate waypoints. In contrast, a restricted driving region, which may be included in the route data, map data, or traffic data provided to vehicles, may define a region within the driving environment that the vehicle is instructed to avoid (and/or increased road segment costs for traversing the region). By determining additional waypoints and/or restricted driving regions for a requested driving trip, the fleet routing system may control the driving route determined by the vehicle to an extent, while still allowing the vehicle to independently determine an optimal route that complies with the route data and efficiently performs the driving trip. For instance, the fleet routing system can determine additional waypoints and/or restricted driving regions that will cause a vehicle to avoid areas that may be congested because of the driving trips currently being performed by other vehicles in the fleet, while still providing the advantages of allowing the vehicle to independently determine an optimal driving route.

Further, in some examples, the fleet routing system may identify sets of alternative and/or interchangeable road segments within a region of the environment. Examples of such regions may include two or more streets running parallel to each other, having similar efficiency and safety features, so that a vehicle could use any of the parallel streets to perform a requested driving trip with little or no difference in the overall route safety or driving efficiency. Similar to restricted regions, regions defining alternative and/or interchangeable road segments (which may be referred to as "distribution regions") can be provided to vehicles in a number of ways, such as within the route data for a requested driving trip, and/or within the map data, traffic data, or other data provided to the vehicle from various data sources. In some examples, the fleet routing system may use distribution regions to influence the vehicles in the fleet to vary the driving routes that the vehicles select, thereby improving the variation and distribution of traffic over the road segments in the distribution region. The improved traffic variation and distribution caused by distribution regions can provide advantages in reducing congestion at particular times when multiple vehicles in the fleet are performing driving trips within or near the distribution region, as well as reducing nuisances to the homes or businesses caused by vehicles that would otherwise programmatically select the same road segment within the distribution region every time.

As described above, when providing route data to a vehicle to perform a requested driving trip, the fleet routing system also may provide data identifying restricted driving regions and/or predicted locations of traffic congestion. The vehicle assigned to perform the driving trip may be configured to independently determine a driving route that complies with the route data received from the fleet routing system, including avoiding any restricted regions and/or predicted congestion points.

Additionally, in some examples, the fleet routing system may provide data to the vehicles in the fleet identifying one or more distribution regions. Based on receiving the distribution regions, the vehicles in the fleet may be configured to independently determine driving routes that cause the vehicles in the fleet to distribute their driving traffic within the distribution regions. As described in more detail below, a distribution region may be defined as a portion of the map of the environment including a set of nearby road segments, such as parallel and/or adjacent streets providing alternative routes through a neighborhood. The alternative roads within a distribution region may have similar characteristics (e.g., number of lanes, road width, speed limit, traffic features, visibility, etc.) and/or similar driving cost values (e.g., safety costs, efficiency costs, passenger comfort costs, etc.).

When the vehicles in the fleet receive route data including a distribution region from the fleet routing system, the vehicles may be configured to independently determine driving routes through the distribution region in a way that may cause the traffic for the fleet as a whole to be less uniform and more distributed within the region. For example, when a vehicle determines a driving route that passes through a distribution region, the route planning component of vehicle may be configured to randomly and/or non-deterministically select one of the alternative/interchangeable road segments within the distribution region. Additionally or alternatively, the route planning component of an individual vehicle may track which of the alternative road segments that the vehicle has previous driven on through the distribution region, and may use heuristics (e.g., a rotating pattern between the alternative road segments) and/or costs (e.g., increase driving costs/weights on previously driven segments), to influence the route planning component to select different road segments for that vehicle on subsequent trips through the distribution region.

In some examples, the fleet routing system may provide different route data to different subsets of the vehicles in the fleet, to influence the different subgroups of vehicles to take different of the alternative road segments through the distribution region. For instance, for a first subset of the vehicles in the fleet, the fleet routing system may add a waypoint on a first of the alternative road segments in the distribution region, and for a second subset of the vehicles in the fleet, the fleet routing system may add a waypoint on a second of the alternative road segments, and so on. The fleet routing system also may provide different subsets of the vehicles in the fleet with different driving costs/weights for the alternative road segments within the distribution region, in order influence the vehicles within the different subsets to select different road segments when passing through the distribution region.

Additionally or alternatively, to improve traffic distribution and non-uniformity within distribution regions, and to more readily determine potential traffic congestion points in the environment, the vehicles in the fleet may be configured to transmit back to the fleet routing system indications of the driving routes independently determined the vehicles. As described below, in some cases, the vehicles in the fleet may be configured to transmit back their complete driving routes (e.g., turn-by-turn data, corresponding times, trajectories followed, etc.) to the fleet routing system. The data indicating a driving routes determined by a vehicle can be transmitted by the fleet routing system after the driving route is initially determined by the vehicle (e.g., before the vehicle has driven the route), and/or while (or after) the vehicle is driving the determined driving route. Based on the driving route data received from the vehicles in the fleet, the fleet routing system may determine which road segments within a distribution region were more heavily trafficked than others, and may adjust the cost values/weights of the road segments to encourage the vehicles in the fleet to select the less trafficked road segments for future trips through the distribution region. Additionally, the fleet routing system also may use the driving route data received from the vehicles in the fleet to predict future locations of traffic congestion at destinations, and/or at intermediate locations and road segments along driving routes.

In some examples, the vehicles in the fleet may transmit, to the fleet routing system, certain data associated with the driving routes independently determined by the vehicles, without transmitting back the complete driving route data. For example, after a vehicle passes through a distribution region, it may transmit back to the fleet routing system data indicating which of the alternative road segments the vehicle used within the distribution region. The fleet routing system may use this limited data, even without having knowledge of the complete driving route taken by the vehicle, to adjust the cost values/weights of the road segments within the distribution region, to encourage the vehicles in the fleet to select other road segments on future trips through the distribution region. Similar techniques may be used to track which routes the vehicles in the fleet generally take through the environment, including tracking when the vehicles drive through potentially congested regions, etc. In some examples, a subset of vehicles can be selected (e.g., based on a centralized planning component) as a group for traversing a distribution region via a respective route. For example, if a distribution region includes several routes for traversing a distribution region from a certain direction, a group may be assigned a finite set of routes for crossing the distribution region.

In some examples, a heatmap may be used to determine a maximum number of vehicles that may occupy a cell of the heatmap at a time. As used herein, a cell may be any discrete region and can be of any shape. For example, a building may include a heatmap with cells each corresponding to a pick up or drop off location or a group of parking spots. A cell may also refer to a street of a distribution area or a set of streets. In examples, vehicles may access a heatmap in real time when planning routes to avoid exceeding the capacity of a cell. In examples, the heatmap may be updated based on planned routes of vehicles. For example, there may exist several heatmaps each corresponding to a time period from a present time extending into the future. When a route is planned, the heatmaps may be accessed to determine if a planned route will result in a cell threshold from being exceeded at a future time.

The techniques described herein can be implemented in a number of ways. Example implementations are provided below with reference to the following figures. Example implementations are discussed below in which the delivery vehicles are implemented as autonomous vehicles. However, the methods, apparatuses, and systems described herein can be applied to fully or partially autonomous delivery vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in an aviation or nautical contexts.

FIG. 1 depicts an example environment 100 illustrating techniques for routing a fleet of vehicles to perform various driving trips in an environment. As shown in this example, a fleet routing system 102 may receive driving trip requests, and may determine route data to provide to individual vehicles 104-108 in the fleet that will perform the requested driving trips. In this example, the environment 100 may include a first vehicle 104, a second vehicle 106, and a third vehicle 108, each of which may be instructed via separate sets of route data provided by the fleet routing system 102 to perform specific driving trips. The vehicles 104-108 may be autonomous vehicles, semi-autonomous vehicles, and/or driver-controlled vehicles. In some cases, the vehicles 104-108 may be autonomous vehicles configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicles 104-108 may be fully or partially autonomous vehicles having any other level or classification. As noted above, the vehicles 104-108 may be ride-hailing service (e.g., taxi service) vehicles, and/or may be delivery service vehicles. Ride-hailing service vehicles may operate within the example environment 100 to provide transportation to passengers from a starting location to a destination. Delivery service vehicles may operate within the example environment 100 to deliver items to various delivery locations.

Within the example environment 100, the vehicles 104-108 may be deployed and/or managed by the fleet routing system 102. In some examples, the fleet routing system 102 may be implemented as a component integrated as a separate server-based system. In other examples, some or all of the components of the fleet routing system 102 may be integrated within systems of the individual vehicles 104-108. As noted above, the fleet routing system 102 may transmit, via one or more networks, route data that includes instructions for performing driving trips. In various examples, the fleet routing system 102 may transmit additional data to the vehicles 104-108, either directly or indirectly via other systems and/or data sources, including map data, traffic data, weather data, etc. As used herein, the term "route data" may refer to any data provided by the fleet routing system 102 to the vehicles 104-108 relating to performing driving trips, including but not limited to driving trip data and/or instructions (e.g., destination location data, time data, etc.), and/or map data, traffic data, weather data, etc. Additionally, in some examples, the vehicles 104-108 also may transmit various data back to the fleet routing system 102, including but not limited to sensor data captured by the sensors of the vehicles 104-108 and/or the complete driving routes determined by the route planning components of the vehicles 104-108.

In various examples, the fleet routing system 102 may deploy and manage any number of vehicles including, but not limited to, coordinating pick-up and drop-off requests from future passengers, providing location data for provisioning of services or delivery of goods, providing suggested routes to individual vehicles in the fleet, etc. In some examples, the fleet routing system 102 may dynamically control vehicle activities by transitioning the vehicles from taxi service vehicles to delivery service vehicles and/or delivery service vehicles to taxi service vehicles. In various examples, the fleet routing system 102 may manage an entire fleet of vehicles covering an entire driving environment, or may manage only a subset of vehicles within a specified portion of the environment.

As noted above, the fleet routing system 102 may be configured to determine route data based on requested driving trips (e.g., pick-up and drop-off locations, associated pick-up and drop-off times, additional waypoints, restricted regions, distributed regions, etc.), and then to transmit the route data to the vehicle selected to perform the driving trip. Then, based on the route data received from the fleet routing system 102, the vehicle may determine a precise driving route (e.g., a turn-by-turn route) to perform the requested driving trip. Within the driving environment, there may be any number of different driving routes that comply with the route data for the requested driving trip, and the vehicle may include various route planning components to determine an optimal driving route to perform the requested driving trip.

As shown in this example, the fleet routing system 102 may include various components configured to perform different functionalities of the vehicle routing techniques described herein. For instance, the fleet routing system 102 may include a driving trip request component 114, a route data determination component 116, a current route heuristics component 118, and a previous route heuristics component 120.

In some examples, the driving trip request component 114 may receive requests for driving trips from various users, such as passengers of a ride-hailing service, merchants, customers, or carriers of an item delivery service, etc. Driving trip requests may include one or more destinations for the requested trip, such as pick-up and/or drop-off locations, intermediate waypoint locations, etc. In some instances, driving trip requests also may include requested times for pick-ups or drop-offs, requested vehicle features and/or specifications, passenger or item information, etc.

After receiving a driving trip request, the fleet routing system 102 may assign the request to a nearby vehicle (e.g., the closest available vehicle to the pick-up location). In some cases, the route data determination component 116 may determine an initial set of route data for the requested trip, including an initial destination (e.g., the passenger or item pick-up location), requested pick-up time, etc. However, as described below, the fleet routing system 102 may include additional components (e.g., the current route heuristics component 118, and previous route heuristics component 120) configured to determine route data for the requested trip, based on the current and/or previous driving trips performed by the fleet. In some examples, the current route heuristics component 118 and/or the previous route heuristics component 120 may have access to the route data previously determined by the fleet routing system 102 for any driving trips currently being performed by the fleet and any previous driving trips of the fleet. As described above, the route data may include the destinations/waypoints but might not include the complete driving route (e.g., the turn-by-turn route) determined by the vehicle. However, in other examples, the current route heuristics component 118 and/or the previous route heuristics component 120 may have access to the complete driving routes (e.g., current and previous) determined and performed by the vehicles in the fleet. For instance, the vehicles in the fleet may independently determine their driving routes (including any on-the-fly route modifications), and may transmit back the driving routes actually performed by the vehicles to the fleet routing system 102.

As noted above, the current route heuristics component 118 may be configured to analyze the driving trips currently being performed by the other vehicles in the fleet. Based on the analysis of the current driving trips, the current route heuristics component 118 may determine that a destination of the requested driving trip may be overcrowded, and/or that a potential road segment of the requested driving trip may be congested. As described below, when determining that a destination or road segment of the requested driving trip may be overcrowded or congested, the route data determination component 116 may change the route data to modify the destination and/or to influence the driving route that will be determined by the vehicle.

In some examples, the current route heuristics component 118 may analyze the current driving trips being performed by the vehicles in the fleet, to determine that a pullover location at a destination of the requested driving may be full or overcrowded. For instance, the current route heuristics component 118 may apply heuristics that compare the size of a pullover location at the destination (e.g., number of spaces, width in feet, etc.) to the number of vehicles in the fleet that have been routed to the pullover location. For instance, if the eight vehicles in the fleet are performing current driving trips that include a destination as a waypoint in their driving trips, and the pullover location at a destination can hold a maximum of eight vehicles, then the current route heuristics component 118 may determine that the destination full or overcrowded. In such cases, the route data determination component 116 may determine a modified destination for the requested driving trip.

In further examples, the current route heuristics component 118 may perform a time-based analysis to predict when each of the vehicles in the fleet will be at each particular destination (e.g., pullover location). Such analyses may use, for each current trip in the fleet that includes the destination, the starting time of the trip, the starting (e.g., pick-up) location, the ending (e.g., drop-off) location, additional waypoints in the trip, and/or the current traffic levels in the area. Based on these and/or other factors, the current route heuristics component 118 may predict when each vehicle will arrive at and depart from each destination. When the number of vehicles predicted to be at a destination exceeds the size of the pullover location at the destination, then the route data determination component 116 may determine a modified destination for the requested driving trip. For instance, if a pullover location at a destination can hold four vehicles, and four vehicles in the fleet have been routed to the destination, but only one of the four vehicles is predicted to be at the destination at the time when the vehicle performing the requested driving trip will be at the destination, then the current route heuristics component 118 may determine that the destination is not full or overcrowded.

In any or all of these examples, the current route heuristics component 118 also may estimate of the number of non-fleet vehicles that are likely to be at the same destination (e.g., using the same pullover location), at the same time that the vehicle handling the requested driving trip will be arriving at that destination. Such estimates may be based on, for example, traffic pattern data in the area during the relevant time period and/or sensor data captured by other vehicles in the fleet. For instance, if a pullover location at a destination can hold eight vehicles, three vehicles in the fleet have been routed to the destination, and the current route heuristics component 118 estimates that five non-fleet vehicles may be at the destination at the relevant time, then it may determine that the destination is full or overcrowded. In this example, the route data determination component 116 may determine a modified destination for the requested driving trip.

When, using the various heuristics and/or the various data relating to the current driving trips for the fleet described herein, the current route heuristics component 118 determines that a destination for a requested driving trip will be potentially full or overcrowded, then the route data determination component 116 may determine a modified destination for the requested driving trip. In some examples, a large destination (e.g., arena, event venue, bus station, airport terminal, etc.) may have multiple parking areas and/or pullover locations at or near the destination. In these examples, determining a modified destination for the requested driving trip may include determining a particular parking area or pullover location, based on determining that one or more of the parking areas or pullover locations may be full or overcrowded.

In some examples, the route data determination component 116 may identify potential modified destinations that include other parking areas or pullover locations that are near but not at the destination, and that may require the user (e.g., a passenger, item sender or recipient, etc.) to walk an additional distance from the destination identified by the user in the driving trip request. In some cases, the route data determination component 116 may use a distance threshold and/or walking time threshold to determine a modified destination for a driving trip request. For a particular driving trip request, the route data determination component 116 may automatically determine and use a modified destination for a requested driving trip, based on determining that the modified destination is less than or equal to N miles (e.g., 0.1 miles, 0.5 miles, etc.) or within N minutes in walking distance (e.g., 1 min, 5 mins, etc.). However, for some driving trip requests, the route data determination component 116 may be prohibited from automatically modifying the destination, for instance. Whether or not a requested destination can be modified may be based, for example, on the preferences of the user requesting the driving trip, and/or using heuristics based on the type of driving trip requested (e.g., an item pickup or delivery, a passenger ride, etc.) and/or the characteristics of the items (e.g., item type, value, weight, etc.) and/or passengers (e.g., number of passengers, ages, time-of-day, etc.). In these cases, when route data determination component 116 automatically determines a modified destination for a requested driving trip, the modified destination may be communicated to the selected vehicle via the route data 122.

In some instances, the route data determination component 116 may transmit a reply to the user that requested the driving trip, to receive authorization from the user to modify the destination of the requested trip. For example, when one or more of the destinations of a requested driving trip are determined to be full or overcrowded (e.g., by the current route heuristics component 118), then the route data determination component 116 may transmit a reply to the user including one or more alternative destinations that may be accepted or rejected by the user. In some cases, such replies can also include estimates of waiting times caused by overcrowding at the requested destinations, and/or corresponding estimates of the waiting times at (and/or walking times to) the alternative destinations that may be selected for the trip request. In these cases, the user that requested the driving trip may have an option to select a modified destination, which will be communicated to the selected vehicle via the route data 122. Alternatively, the user may reject the modified destinations, in which case the route data 122 may include the originally requested destination.

The above examples relate to techniques for determining a modified destination, based on the current route heuristics component 118 determining that a requested destination may be full or overcrowded. However, the current route heuristics component 118 also may use similar or identical techniques for determining that some or all of the potential driving path of a requested driving trip (e.g., one or more road segments), may be overcrowded and congested. For instance, the current route heuristics component 118 may apply various heuristics based on the current driving trips of the vehicles in the fleet, including the various destinations of the trips (e.g., starting locations, ending locations, waypoints), starting times, ending times, known or likely driving paths, current traffic data, etc. Using such heuristics, the current route heuristics component 118 may determine whether a road segment that will likely (or necessarily) be driven during the requested driving trip may be potentially overcrowded and congested at the time when it will be driven. Such determinations may take into account potential road segment congestion from other vehicles in the fleet (e.g., based on current trip data for the fleet), and/or non-fleet vehicles (e.g., based on traffic data).

As noted above, the current route heuristics component 118 may or may not have access to the complete driving routes performed by the vehicles in the fleet. When the complete driving routes (e.g., turn-by-turn data, corresponding time data, etc.) are known for the other vehicles in the fleet, this data may be used to more precisely determine the traffic volume on various road segments at various times, which can be compared to the characteristics of the road segment (e.g., number of lanes, speed limit, stop signs, traffic lights and other features, intersections, speed bumps, etc.) and/or additional traffic data, to determine the likely congestion on the road segment. In contrast, when the complete driving routes for the other vehicles in the fleet are not available, the current route heuristics component 118 may determine the anticipated driving routes that the fleet vehicles are likely to use to perform their driving trips, and may use the anticipated route data in a similar probabilistic analysis.

In such examples, when the current route heuristics component 118 determines that a road segment that will (or may) be used for a requested driving trip is likely to be congested, then the route data determination component 116 may modify the route data 122 provided to the vehicle in order to influence the vehicle to avoid the congested road segment. As described above, such modifications to the route data 122 can include adding new waypoints and/or restriction regions to the route data 122, at selected locations in the environment that will control or influence the vehicle to avoid the location of the congested road segment. For instance, an additional waypoint along a secondary driving path may cause the vehicle to select the secondary path rather than a primary path through a congested region. Similarly, a restricted region defined by route data determination component 116 that includes the congested road segment may cause the vehicle to select an alternative driving path around the restricted region.

The previous (or historical) route heuristics component 120 may be configured to analyze the driving trips previously performed by the fleet (e.g., including the vehicle selected to perform the requested driving trip and/or any other vehicles). Based on the analysis of the previous driving trips, the previous route heuristics component 120 may determine patterns among the previous driving routes, in which the fleet frequently or always selected one driving path (or a portion thereof), when a number of additional alternative driving paths (or portions thereof) were available having small or negligible differences in terms of driving safety and efficiency. For instance, a set of parallel and/or adjacent road segments (e.g., streets) in a neighborhood may have similar road characteristics such as the number of lanes, road width, speed limit, traffic features, visibility, etc. However, due to the programmatic route-planning components used by the autonomous vehicles in the fleet, the vehicles may usually or always use one particular road, and may rarely or never use the similar parallel/adjacent roads. As described below, in such examples, the previous route heuristics component 120 may determine a distribution region that includes the set of the similar parallel and/or adjacent road segments. The route data determination component 116 then may provide the distribution region to the vehicles in the fleet, which may use distribution region in various ways to influence the vehicles to distribute their future driving routes more evenly among the various roads in the distribution region.

To determine a distribution region within a driving environment, the previous route heuristics component 120 may use a number of techniques, individually or combination. In some examples, the previous route heuristics component 120 may analyze the map data of the environment and/or sensor data captured by the vehicles in the fleet to determine various costs associated with road segments in the environment. For instance, the previous route heuristics component 120 may compute, for each individual road segment, safety costs (e.g., based on identifying traffic features, potential intersection points, road width, road conditions and surface material, visibility, the proximity of the road to non-drivable surface(s), etc.), comfort costs (e.g., road speed limit, acceleration and/or jerk metrics associated with the road segment, road features such as potholes, etc.) and route progress costs (e.g., based on starting and ending points of the road segment, the length of the road segment, the speed limit on the road segment, etc.), and the like. To evaluate an overall cost associated with a road segment, the previous route heuristics component 120 may sum the various types of costs associated with the road segment.

Using similar or identical techniques, the previous route heuristics component 120 may compute the individual road segment costs for a group of adjacent and/or parallel road segments. Based on the relative position of the group of adjacent and/or parallel road segments within the driving environment, the group of road segments may represent alternative paths in any number of potential driving routes. In some examples, when the cost differences between two or more nearby road segments (e.g., adjacent and/or parallel) are less than a threshold cost difference, the previous route heuristics component 120 may designate the set of road segments as alternative (and/or interchangeable) road segments. Additionally or alternatively, in some cases, human-assisted selection and grouping of road segments may be used to determine sets of alternative or interchangeable road segments in a driving environment.

In some instances, the previous route heuristics component 120 also may analyze the previous driving paths of the vehicles in the fleet to determine which of the alternative road segments the vehicles followed. Such a determination may be optional in some examples and, as noted above, the previous route heuristics component 120 might not have access to the complete driving routes for the vehicles in the fleet. However, when such data is available, the previous route heuristics component 120 may use it to determine when the vehicles in the fleet inordinately used one particular road segment and rarely or never used the other alternative road segments.

Based on these analyses, including evaluating cost differences between sets of road segments, human-assisted grouping, and/or analyzing the previous driving patterns of the fleet, the previous route heuristics component 120 may determine a distribution region within the driving environment, including two or more road segments that may be selected alternatively and/or interchangeably by the vehicles in the fleet when determining and performing driving routes. As noted above, it may be advantageous for the fleet routing system 102 to determine distribution regions, in order to encourage vehicles to select the rarely used alternative road segments, thereby improving traffic distribution and variation of route selection. Such techniques may improve driving efficiency among the fleet as a whole by avoiding congestion, and collecting and evaluating data on alternative routes more frequently. Additionally, such techniques may minimize the nuisance to homes and businesses on heavily-trafficked routes, and may improve fleet visibility on lesser-used routes.

After the previous route heuristics component 120 determines one or more distribution regions within the driving environment, the route data determination component 116 may transmit data identifying the distribution regions to the vehicles in the fleet as modified route data 122. For both distribution regions and restricted regions, the modified route data 122 may be in the form of supplemental and/or modified map data, traffic data, etc. As described above, a restricted region may identify a portion of the map data including at least one road segment, with an instruction (or indication) to the vehicle that the restricted region is to be avoided. In contrast, a distribution region may encompass two or more alternative road segments within the map data, and may include an instruction (or indication) that the vehicle is to treat the alternative road segments as interchangeable when determining driving routes.

As described above, each of the vehicles 104-108 (as well as other vehicles in the fleet), may be configured to determine complete driving routes, including specific trajectories and turn-by-turn driving routes for the vehicle to perform the requested driving trip, based on the route data 122 provided by the fleet routing system 102. As shown in this example, the vehicles 104-108 in the fleet may include various components configured to determine complete driving routes, including sensors 124, a perception component 126, and/or a planning (or route planning) component 128.

To determine a complete driving route based on route data provided by a fleet routing system 102, the vehicle 104 may receive sensor data from sensors 124. Sensors 124 may include, for example, image sensors (e.g., cameras), lidar sensors, radar sensors, time-of-light sensors, environmental sensors, audio sensors, inertial sensors, sonar sensors, location sensors (e.g., a GPS), and various other sensors configured to capture data representing the external environment around the vehicle 104. The perception component 126 may be configured to use sensor data from the sensors 124 (and/or additional data) to detect and classify objects in the environment surrounding the vehicle 104. Based on the sensor data, perception data, and/or additional data received from various components of the vehicle 104 (e.g., map data, prediction data, localization data, traffic data, etc.), the planning component 128 may determine the complete driving route and instructions for controlling the operation of the vehicle 104 to perform the requested driving trip.

As described above, the fleet routing system 102 may provide route data to the vehicles 104-108, to control the vehicles to perform requested driving trips. A set of route data may include one or more destinations (e.g., a pick-up location, drop-off location, intermediate waypoint locations, etc.) for a requested driving trip. Based on the received route data, the planning component 128 of each vehicle 104-108 may determine a complete driving route for the vehicle to traverse the driving environment to reach the destinations within their respective route data. As shown in map 130, fleet routing system 102 has determined separate route data 122 for each of the vehicles 104-108. Based on the route data 122, the planning component 128 of vehicle 104 has determined a driving route to a first destination 132, the planning component 128 of vehicle 106 has determined a driving route to a second destination 134, and the planning component 128 of vehicle 108 has determined a driving route to a third destination 136.

In various examples described herein, the fleet routing system 102 may determine modified route data for a vehicle selected to perform a requested driving trip. In some cases, a set of modified route data received from the fleet routing system 102 can include one or more modified destinations and/or additional waypoints. In such cases, the planning component 128 may determine a driving route that causes the vehicle to navigate to each of the modified destinations and/or additional waypoints.

Additionally or alternatively, the set of modified route data received from the fleet routing server 104 may include one or more restricted regions and/or distribution regions. As described above, a restricted region may identify one or more road segments in the map data over which the vehicle is not permitted to traverse. In contrast, a distribution region may identify two or more road segments in the map data that the vehicle should treat as alternative road segments when determining driving routes. In these cases, the planning component 128 may determine a driving route that complies with the received restriction regions (e.g., by avoiding the prohibited road segments), and the distribution regions (e.g., by varying/distributing driving routes within the region).

In some examples, restricted regions and/or distribution regions may be provided to the vehicles 104-108 in the fleet in the form of modified map data. For instance, the route data determination component 116 may determine new and/or modified feature values for particular road segments within the map data. The modified feature values for a road segment may represent, for example, traffic counter statistics indicating the number of vehicles to traverse the road segment, and/or cost values associated with traversing the road segment. For a restricted region, the route data determination component 116 may assign the road segment(s) a sufficiently high cost value, so that the planning component 128 will avoid the road segment(s) when determining a driving route. For a distribution region, the route data determination component 116 may assign each alternative road segment with a similar or identical traffic counter value and/or cost value. Then, the planning component 128 may be configured to traffic counter value and/or cost value for the road segment, to increase the likelihood that the planning component 128 may select a different road segment within the distribution region for the next route. In some cases, the traffic counter values and/or cost values used for road segments within regions distribution regions may be used by a single vehicle, while in other cases the traffic counter values and/or cost values may be shared between the vehicles 104-108 in the fleet.

Figure 2A:
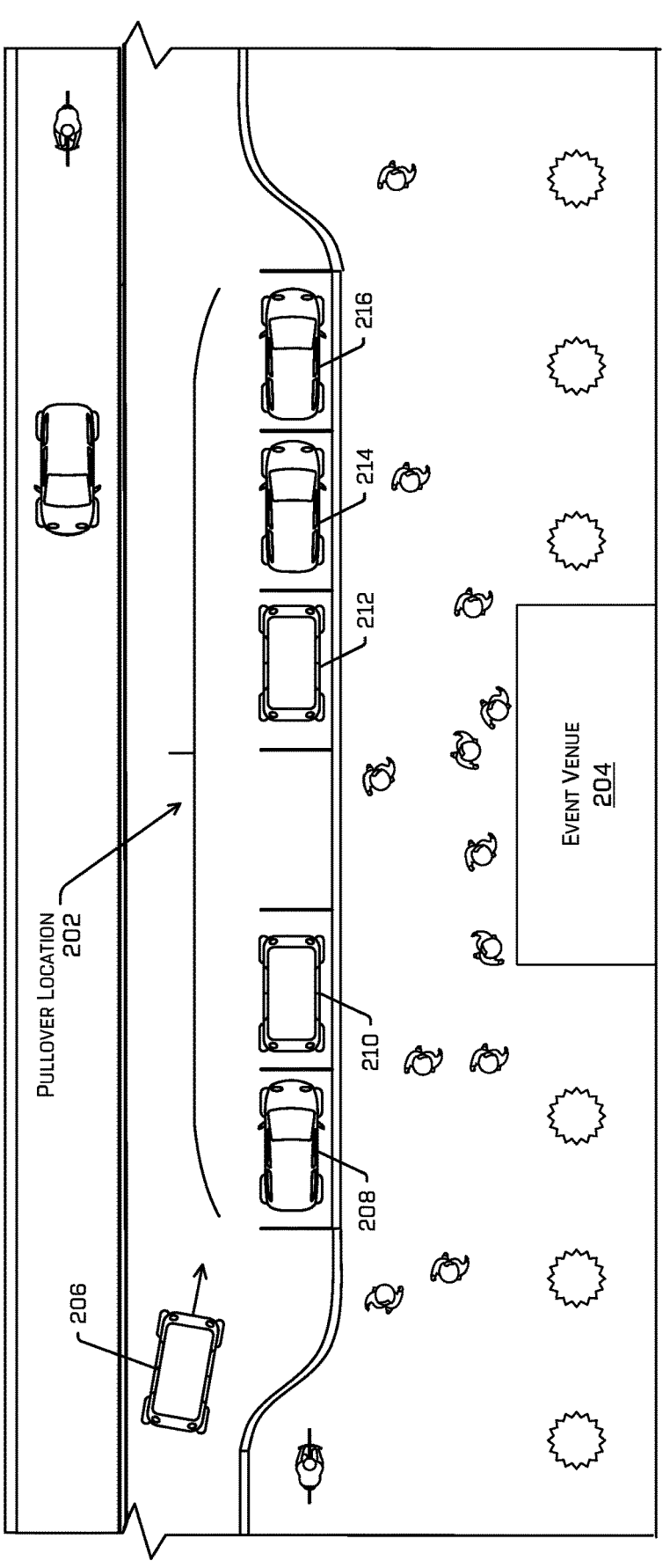
FIG. 2A depicts an example of a pullover location for vehicles to perform pick-ups and drop-offs at a destination, in accordance with one or more examples of the disclosure.

FIG. 2A is a diagram 200 illustrating an example pullover location 202 associated with an event venue 204. In various examples, the event venue 204 may represent an arena, concert venue, convention hall, or the like. In diagram 200, the event venue 204 is shown at a time that may be close to the start or the end of an event, and several pedestrians are shown near the pullover location 202 outside the venue. One or more of the pedestrians shown in this example may be passengers of a ride-hailing service, using vehicles that drop off and/or pick up passengers at the pullover location 202. As used herein, the term destination may refer to a general location such as the event venue 204, a transportation hub/terminal, etc., from which or to which a user may request an item delivery or a passenger pick-up/drop-off. Additionally or alternatively, a destination may refer to a particular pullover location 202 associated with a general location. In some cases, a general location (e.g., an event venue 204, a ferry terminal, a bus station, a hotel may, etc.) may have multiple associated pullover locations 202, such as different short-term parking or passenger pick-up lanes, which can be distributed on different sides of the venue or adjacent different exits, etc.

As shown in this example, the pullover location 202 is capable of holding a maximum of six cars. At the time depicted, five vehicles 208-216 are shown parked in the pullover location 202, including two vehicles belonging to a fleet of autonomous vehicles (e.g., vehicle 210 and vehicle 212), and three non-fleet vehicles (e.g., vehicle 208, 214, and 216). Additionally, a sixth vehicle 206 is shown approaching the pullover location 202 to perform a passenger pick-up or a passenger drop-off.

In this example, the vehicle 206 may be a vehicle in the same driving fleet as vehicle 210 and vehicle 212. Vehicle 206 may be a vehicle routed by the fleet routing system 102 to handle a requested driving trip. As described above, after receiving the driving trip request and assigning vehicle 206 to perform the requested driving trip, the fleet routing system 102 may analyze the current driving trips being performed by the fleet (e.g., using the current route heuristics component 118). Using the techniques described herein, the fleet routing system 102 may determine whether to route the vehicle 206 to its requested destination (e.g., pullover location 202) or to determine a modified destination for the requested driving trip. In various examples, the fleet routing system 102 may use the size of the pullover location 202, and/or the number of vehicles in the fleet currently parked at or on-route to the pullover location 202, during the relevant time period when the assigned vehicle 206 is scheduled to arrive at the pullover location 202. In some cases, the fleet routing system 102 also may determine a predicted number of non-fleet vehicles (e.g., based on traffic data) or an actual number of non-fleet vehicles (e.g., based on sensor data from the fleet vehicles 210 and 212), that are parked or on-route to the pullover location 202 during the relevant time period.

In the example shown in diagram 200, the fleet routing system 102 may have previously routed the vehicle 206 to the pullover location 202, by applying heuristics based on any combination of the various factors described herein. Based on the heuristics performed, the fleet routing system 102 may have determined that the pullover location 202 would likely have at least one available parking and/or pullover space to accommodate the vehicle 206. Thus, in this example, the route data provided by the fleet routing system 102 to the vehicle 206 may include the pullover location 202 as a destination of the driving trip.

In other examples, when the fleet routing system 102 determines that the pullover location 202 will possibly (or likely) be completely filled by a combination of fleet and/or non-fleet vehicles, it may modify the route data provided to the vehicle 206 to include a modified destination to replace the pullover location 202. In such examples, the modified destination may include a different pullover location associated with the event venue 204, or a different location near the event venue 204.

Figure 2B:
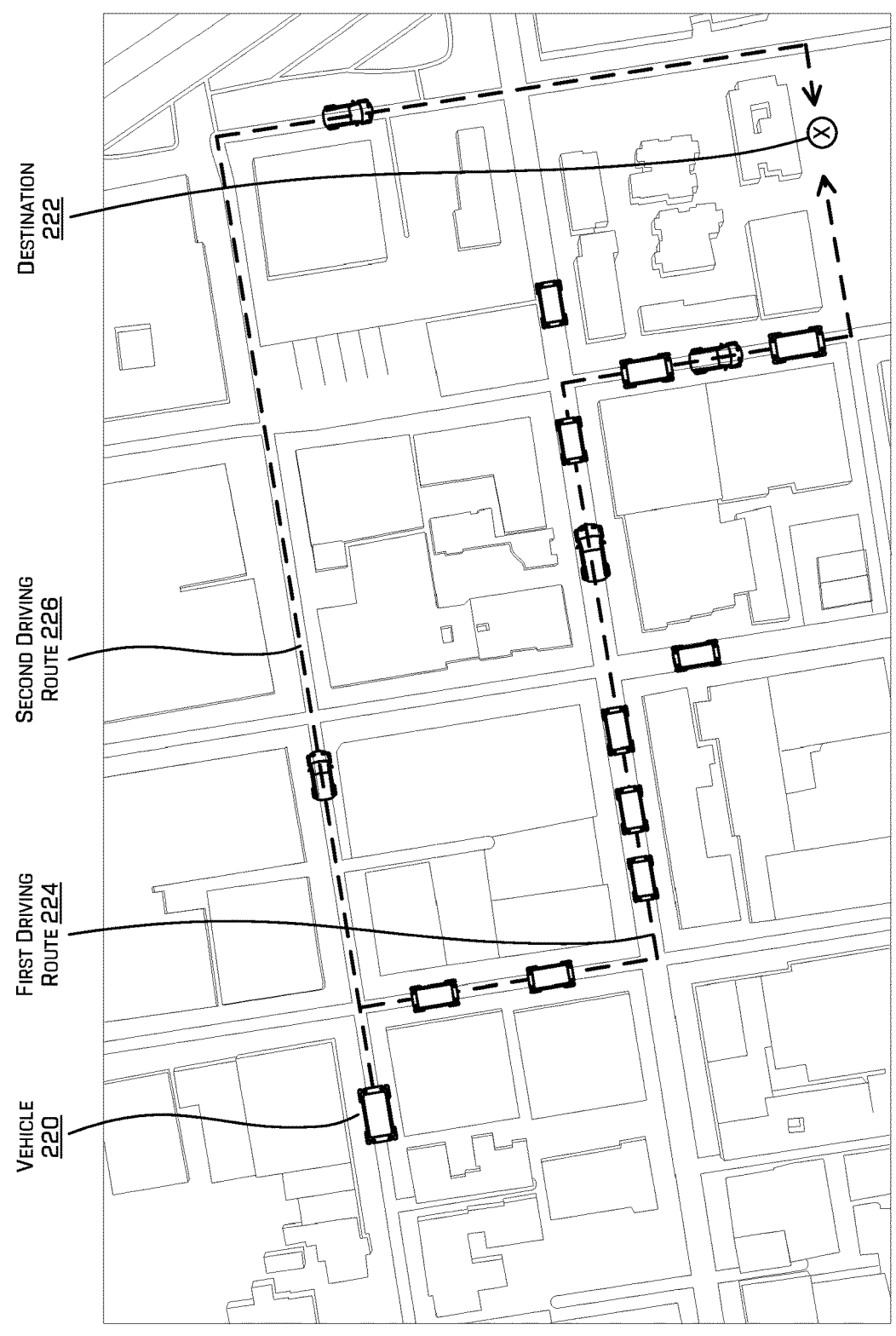
FIG. 2B depicts an example map of a driving environment, including alternative driving routes for a vehicle to navigate to a destination, in accordance with one or more examples of the disclosure.

FIG. 2B depicts another diagram 218 illustrating two example driving routes that may be determined for a vehicle 220 to reach a destination 222. As shown in this example, the vehicle 220 may be a vehicle in a driving fleet associated with and/or managed by a fleet routing system 102. In response to a requested driving trip (e.g., a passenger pick-up or drop-off), the vehicle 220 may be routed by the fleet routing system 102 to the destination 222. As described above, after receiving the driving trip request and assigning vehicle 220 to perform the requested driving trip, the fleet routing system 102 may analyze the current and/or previous driving trips performed by the fleet (e.g., using the current route heuristics component 118 and/or previous route heuristics component 120). Using the techniques described herein, the fleet routing system 102 may determine whether a first driving route 224 the vehicle 220 may take to the destination 222 is likely to be congested and/or slow. In various examples, the fleet routing system 102 may apply heuristics based on the number of vehicles in the fleet that have been routed on or near the first driving route 224 during the relevant time period when the vehicle 220 might be driving on the route. In some cases, the fleet routing system 102 also may determine a predicted number of non-fleet vehicles that may be on the first driving route 224, based on current or historical traffic data and/or based on sensor data from the other vehicles in the fleet that are currently driving on or near the first driving route 224.

In the example shown in diagram 218, the fleet routing system 102 may have determined that the first driving route 224 is likely to be congested, based on the additional vehicles in the fleet known to be driving the first driving route 224, and/or additional non-vehicles predicted or detected by the fleet on the first driving route 224, by applying heuristics based on any combination of the various factors described herein. In some instances, the first driving route 224 might not be congested when the driving trip request is received and/or when vehicle 220 is assigned to handle the request and provided with the route data to the destination 222. However, based on the data available to the fleet routing system 102, it may determine that a number of other vehicles in the fleet are scheduled to be on the first driving route 224 during time periods that overlap with the time when the vehicle 220 would take the first driving route 224 to reach the destination 222. Therefore, in such cases, the route data provided by the fleet routing system 102 to the vehicle 220 may include modified route data to control and/or influence the vehicle 220 to determine a route that is less congested (and/or predicted to be less congested during the time periods that the vehicle 220 is scheduled to drive the route), such as the second driving route 226. As described herein, the techniques for determining modified route data for the vehicle 220 in this example may include determining a slightly modified destination location (e.g., a pullover location on the opposite side of the destination building, etc.), or determining an additional waypoint or restricted region to cause the vehicle 220 to determine an alternative driving route to avoid the congestion along the first driving route 224.

Figure 3:
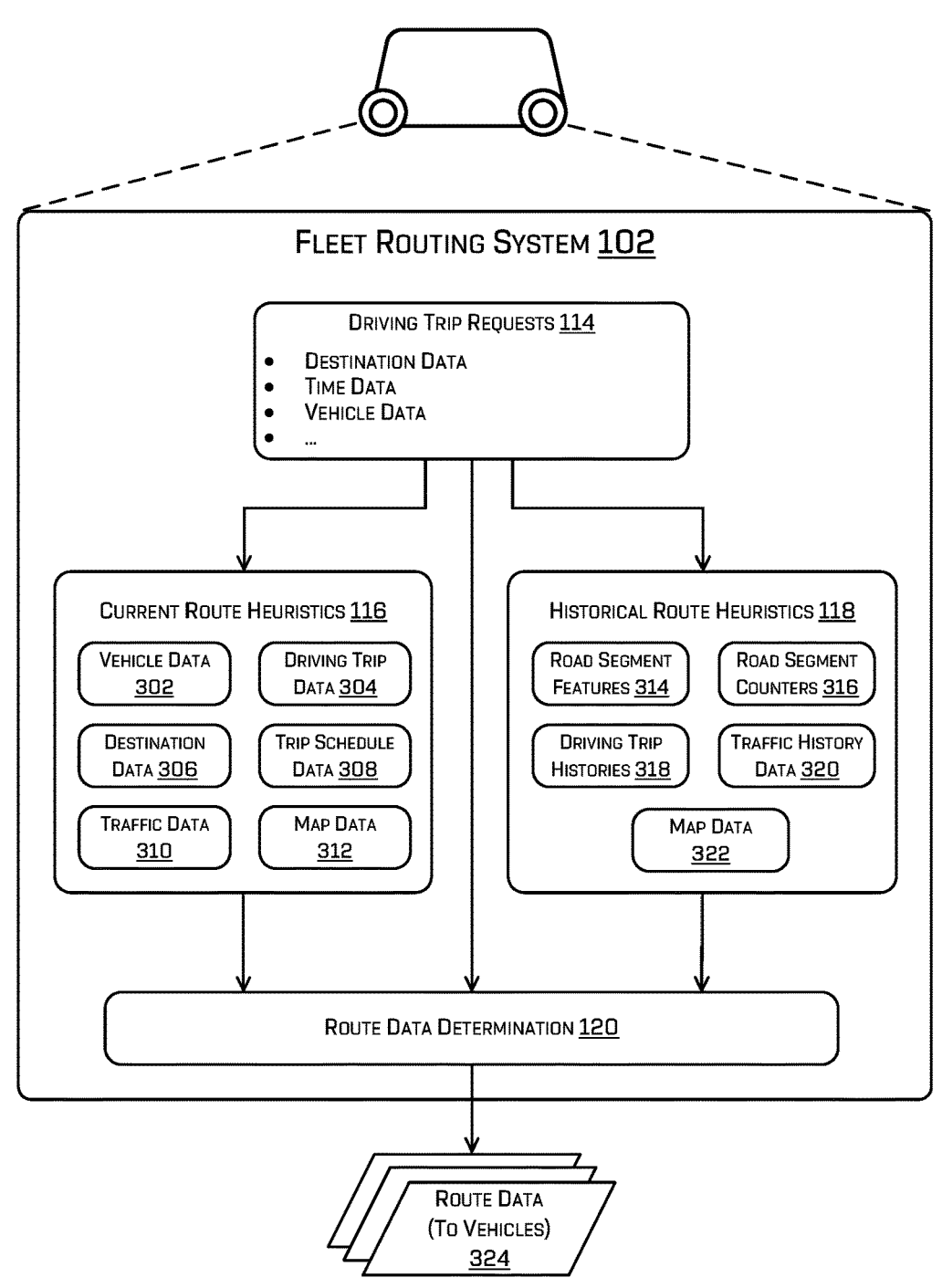
FIG. 3 illustrates an example fleet routing system, including components configured to receive driving trip requests and determine route data for vehicles in the fleet, in accordance with one or more examples of the disclosure.

FIG. 3 illustrates an example system 300 including various systems and/or components of a fleet routing system 102. As described above, the fleet routing system 102 may include a driving trip request component 114, a route data determination component 116, a current route heuristics component 118, and a previous route heuristics component 120.

The driving trip request component 114 may receive requests for driving trips from users (e.g., ride-hailing service passengers, item delivery service merchants or customers, etc.) Driving trip requests may include, for example, a set of requested destinations (e.g., pick-up and/or drop-off locations, intermediate waypoint locations, etc.), as well as corresponding times, requested vehicle types/features (e.g., vehicle size or configuration), passenger or item identification information, and the like.

After receiving a driving trip request, the fleet routing system 102 may determine one or more vehicles in the fleet to handle the request. The fleet routing system 102 also may execute one or more heuristics within the current route heuristics component 118 and/or the previous route heuristics component 120, to potentially determine modified route data for the requested driving trip.

The current route heuristics component 118 may be configured to analyze the driving trips currently being performed by the other vehicles in the fleet. Based on the analysis of the current driving trips, the current route heuristics component 118 may determine that a destination of the requested driving trip potentially may be overcrowded, and/or that a road segment that potentially may be selected by the vehicle for driving the requested driving trip may be congested. As shown in this example, the current route heuristics component 118 may receive and use various types of data from different data sources, to analyze the current driving trips of the fleet in order to determine if a newly requested driving trip might require a modified destination and/or alternative driving road. For instance, the current route heuristics component 118 may receive vehicle data 302, driving trip data 304, destination data 306, and/or trip schedule 308 for any vehicles in the fleet that are currently routed to and/or performing driving trips within the same driving environment as the requested driving trip. Additionally or alternatively, the current route heuristics component 118 may receive current traffic data 310 (e.g., from traffic data sources and/or from sensors of the vehicles in the fleet), and/or map data 312. Based on the various data described herein, the current route heuristics component 118 may use various heuristic analyses to determine (e.g., with certainty or based on a probability threshold), that a destination for a requested driving trip is full or overcrowded, or that a possible driving route for a requested driving trip is congested.

In contrast, the previous (or historical) route heuristics component 120 may be configured to analyze the driving trips previously performed by the fleet, and to identify patterns among the previous driving routes in which the fleet frequently or always selected a particular driving path (e.g., one or more road segments) when additional alternative driving paths were available having small or negligible differences in terms of driving safety and efficiency. As shown in this example, the previous route heuristics component 120 may receive, based on a set of previous driving trips performed by of the fleet, road segment feature data 314, road segment counters 316, driving trip history data 318, historical traffic data 320, and/or historical map data 322.

Additionally, although certain examples described herein may use heuristics based on the current and/or previous driving trips performed by the vehicles of the fleet, in other examples, the fleet routing system 102 may train and use machine-learned models (e.g., neural networks) to perform any or all of the same determinations. For example, instead of or in addition to using heuristics, the fleet routing system 102 may train machine-learned models based on current snapshots of vehicle fleet data, to determine when a destination or possible route of a requested driving trip is likely to be full or congested. Additionally, the fleet routing system 102 may train machine-learned models to determine, based on the previous driving trip data associated with a vehicle fleet, patterns of previous driving routes and/or alternative routes.

After receiving a driving trip request, the route data determination component 116 may determine the route data 324 to provide the vehicle in the fleet that has been assigned to perform the requested trip. As described above, the route data determination component 116 may determine an initial set of route data based on the driving trip request (e.g., including destination locations, times, etc.), and then may determine modified route data (e.g., route data 324) based on the current route heuristics component 118 and/or and a previous route heuristics component 120. Such modified route data 324 may include, for example, modified destinations and/or times for the requested driving trip, additional waypoints, restricted regions, and/or distribution regions. As described above, some elements of the modified route data 324 (e.g., restricted regions and/or distribution regions) may take the form of modified or supplemental map data, traffic data, etc., that can be provided to different components of the vehicle and/or from different data sources. The vehicle assigned to perform the requested driving trip may use the route data 324 to determine and perform a driving route that complies the route data 324.

Figure 4:
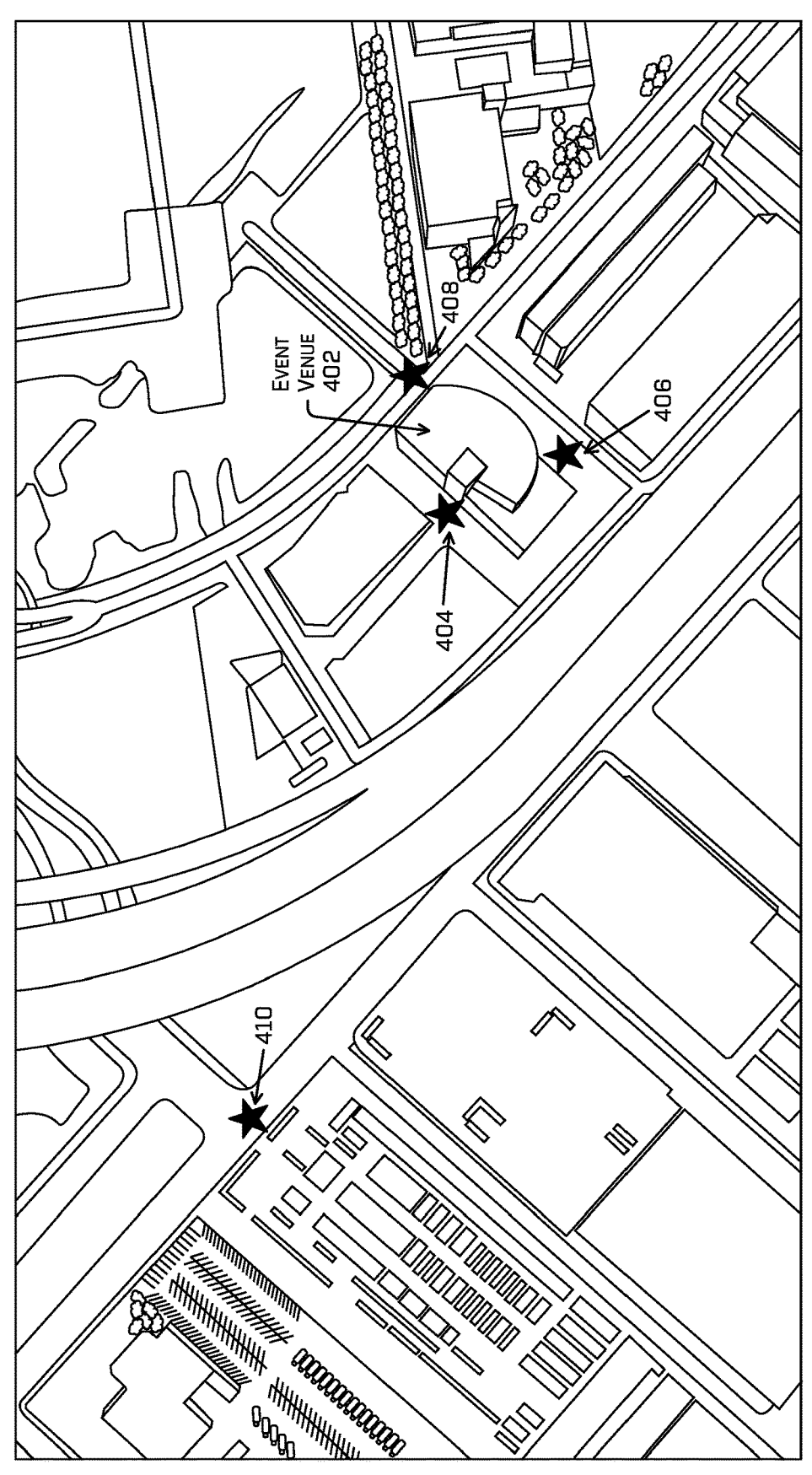
FIG. 4 depicts an example map of a driving environment including a requested destination (e.g., an event venue) and number of associated destinations for a vehicle to perform pick-ups or drop-offs (e.g., pullover locations), in accordance with one or more examples of the disclosure.

FIG. 4 shows a map 400 of an example driving environment including a number of a possible destinations that may be used for requested driving trips. As shown in this example, an event venue 402 includes a number of associated pullover locations 404, 406, and 408, which may include short-term parking areas, passenger pick-up zones, and the like. The map 400 also depicts another pullover location 410 a few blocks away from the event venue 402.

In this example, various techniques may be illustrated for determining modified destinations for a requested driving trips. As described above, the fleet routing system 102 may receive a requested driving trip from a user including one or more destinations (e.g., pick-up locations, drop-off locations, etc.). After receiving a driving trip request, the fleet routing system 102 may analyze the current driving trips being performed by the other vehicles in the fleet (and/or various additional data) to determine whether or not the requested destination(s) may be full or overcrowded. Based on such analyses (e.g., including current route heuristics component 118), the fleet routing system 102 may determine one or more modified destinations for the requested driving trip.

In certain scenarios, a user may request a driving trip from or to a general destination, such as the event venue 402, and the fleet routing system 102 may determine a specific nearby location, such as one of the pullover locations 404, 406, 408, as the location to which the assigned vehicle is to be routed. In such scenarios, the fleet routing system 102 may use the various techniques described herein to separately evaluate each of the associated pullover locations 404, 406, and 408, and to select an optimal pullover location based (at least in part) on which pullover location is less likely to be full or crowded. In some cases, the fleet routing system 102 may determine a closest of the pullover locations 404, 406, and 408 that is predicted not to be full. The fleet routing system 102 then may respond to the driving trip request to identify the selected pullover location, and may use the selected pullover location in the route data provided to the vehicle. Additionally, as described above, in some cases the fleet routing system 102 may provide users with multiple options corresponding to different pullover locations, including listing the locations of each available nearby pullover location, a prediction of the likely availability of the pullover location, and/or an estimate wait time associated with the pullover location. After receiving a selection from the user, the fleet routing system 102 use the selected pullover location in the route data provided to the vehicle.

In other scenarios, a user may request a driving trip to or from a specific location (e.g., a specific one of the pullover locations 404, 406, 408), and the fleet routing system 102 may perform the techniques described herein to determine whether or not the specific location is full or overcrowded. When determining that a specifically requested destination (e.g., pullover location 404) is likely to be full or overcrowded, the fleet routing system 102 may determine a modified destination using the techniques described above. For instance, the fleet routing system 102 may select a closest available destination (e.g., pullover location 406, 408, or 410), that is not full or overcrowded. After determining one or more possible modified destinations, the fleet routing system 102 may modify the route data for the requested driving trip, either automatically or by requesting approval from the user, and then may provide the modified route data to the vehicle.

FIGS. 5A-5D depict four additional maps of an example driving environment, showing a vehicle 502 that has been assigned by a fleet routing system 102 to traverse the environment to a destination 506 as part of a requested driving trip. In this example, the vehicle 502 may determine any number of possible driving routes (or driving paths) to navigate the environment to reach the destination 506. As described above, in some cases the vehicle 502 may use a planning component 128 to independently determine the driving route that the vehicle 502 will use to reach the destination 506, based on the route data provided by the fleet routing system 102 and various additional data (e.g., map data, traffic data, etc.).

As described above, the fleet routing system 102 may analyze the current driving trips performed by the vehicles in the fleet (e.g., using the current route heuristics component 118) and/or the previous driving trips performed by the fleet (e.g., using the previous route heuristics component 120). Based on these analyses, the fleet routing system 102 may determine to influence the vehicle 502 to take a different route through the environment to reach the destination 506. As described above, the vehicle 502 may use a planning component 528 to independently determine its route to the destination 506. As a result, in some examples the fleet routing system 102 might not know the complete driving route that the vehicle 502 plans to take or will ultimately perform to reach the destination 506. Nonetheless, the fleet routing system 102 can influence the route selected by the vehicle 502 in a number of ways, using the techniques described herein, including influencing the vehicle 502 to drive on certain road segments, avoid other road segments, and/or distribute its driving more evenly (e.g., less uniformly) within certain regions of the environment.

Figures 5A, 5B:
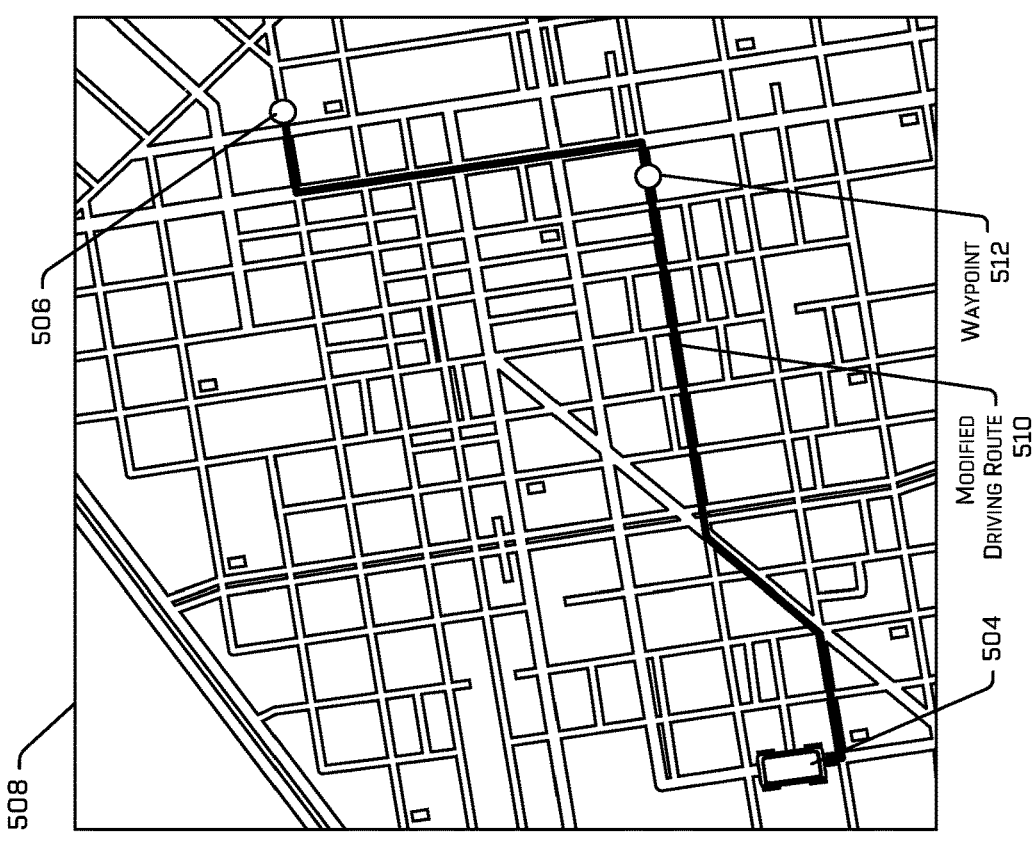
FIGS. 5A-5D depict example maps of a driving environment including various driving routes determined by a vehicle, based on route data provided by a fleet routing system, in accordance with one or more examples of the disclosure.

In FIG. 5A, a map 500 is shown depicting a first driving route 504 determined by the vehicle 502 to traverse the environment to the destination 506. In this example, the vehicle 502 may use a planning component 128 to determine a preferred or optimal driving route for the vehicle 502 to reach the destination 506 based on the initial (or unmodified) route data provided by the fleet routing system 102. The initial route data may include the destination(s) provided by the user in the driving trip request, times, passenger or item information, etc. As shown in this example, the vehicle 502 has determined the first driving route 504 as an optimal route for reaching the destination 506.

In FIG. 5B, another map 508 is shown depicting a second driving route 510 determined by the vehicle 502 to traverse the environment to the destination 506. In this example, to influence the driving route that the vehicle 502 will determine, the fleet routing system 102 has provided modified route data to the vehicle 502 including an additional waypoint 512. Based on the presence of the additional waypoint 512, the planning component 128 of the vehicle 502 has determined the second driving route 510 as an optimal route for reaching the destination 506 via the additional waypoint 512, thus resulting in the vehicle 502 performing a different driving route than the first driving route 504.

Figure 5D:
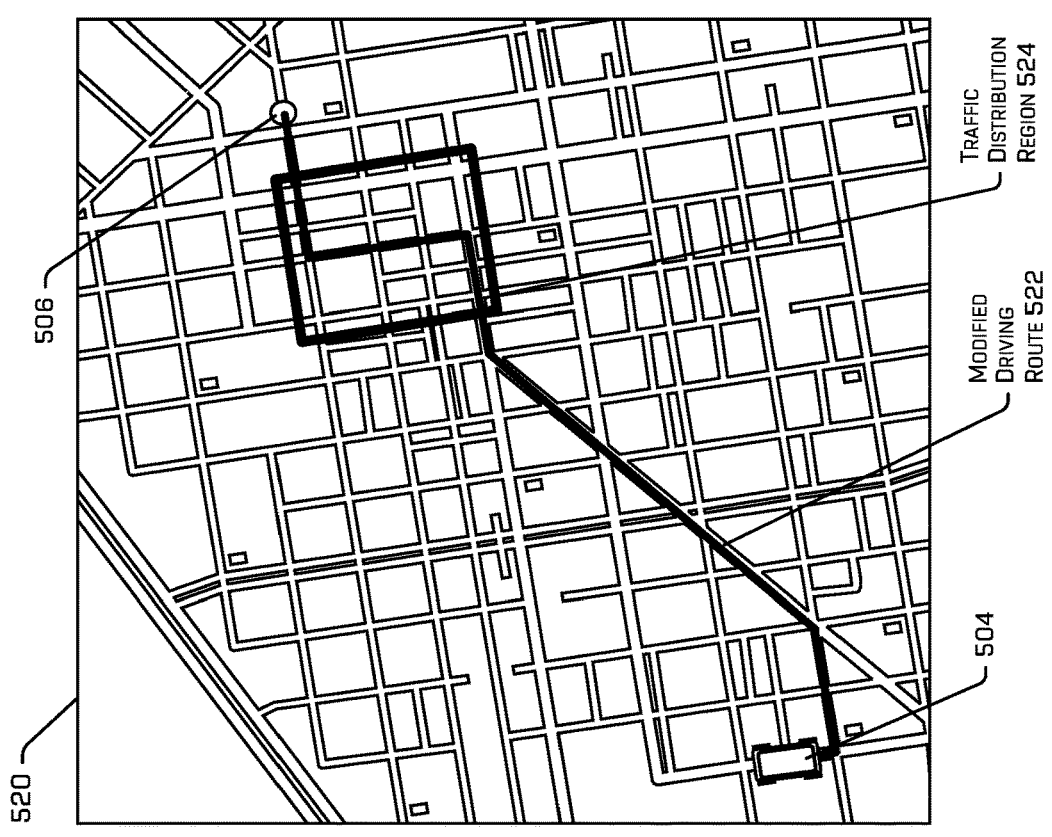
Figure 5C:
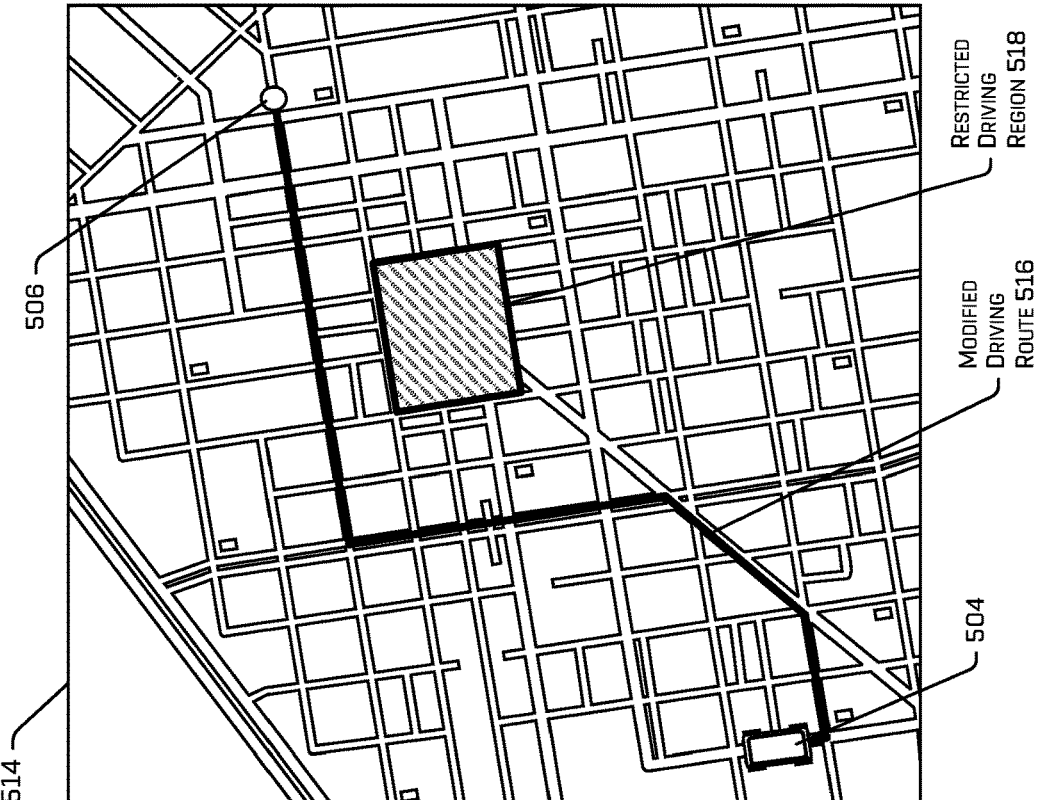

In FIG. 5C, another map 514 is shown depicting a third driving route 516 determined by the vehicle 502 to traverse the environment to the destination 506. In this example, to influence the driving route that the vehicle 502 will determine, the fleet routing system 102 has provided modified route data to the vehicle 502 including a restricted driving region 518. Based on the presence of the restricted driving region 518, the planning component 128 of the vehicle 502 has determined the third driving route 516 as an optimal route for reaching the destination 506 while avoiding the restricted driving region 518, thus resulting in the vehicle 502 performing a different driving route than either the first or second driving routes.

In FIG. 5D, another map 520 is shown depicting a fourth driving route 522 determined by the vehicle 502 to traverse the environment to the destination 506. In this example, to influence the driving route that the vehicle 502 will determine, the fleet routing system 102 has provided modified route data to the vehicle 502 including a traffic distribution driving region 524. Because the route determined by the vehicle 502 passes through the distribution driving region 524, the planning component 128 of the vehicle 502 may be configured to modify the portion of the driving route determined within the distribution driving region 524 to increase route variation and non-uniformity. As described above, the planning component 128 may be configured to treat the different road segments within the distribution driving region 524 as alternatives and/or interchangeable, to improve traffic distribution within the region. The planning component 128 also may be configured to increase road segment counters and/or costs associated with road segments after a particular road segment is selected, in order to increase the likelihood that a different road segment will be selected for subsequent driving trips (e.g., by the same vehicle and/or different vehicles in the fleet).

Figure 6:
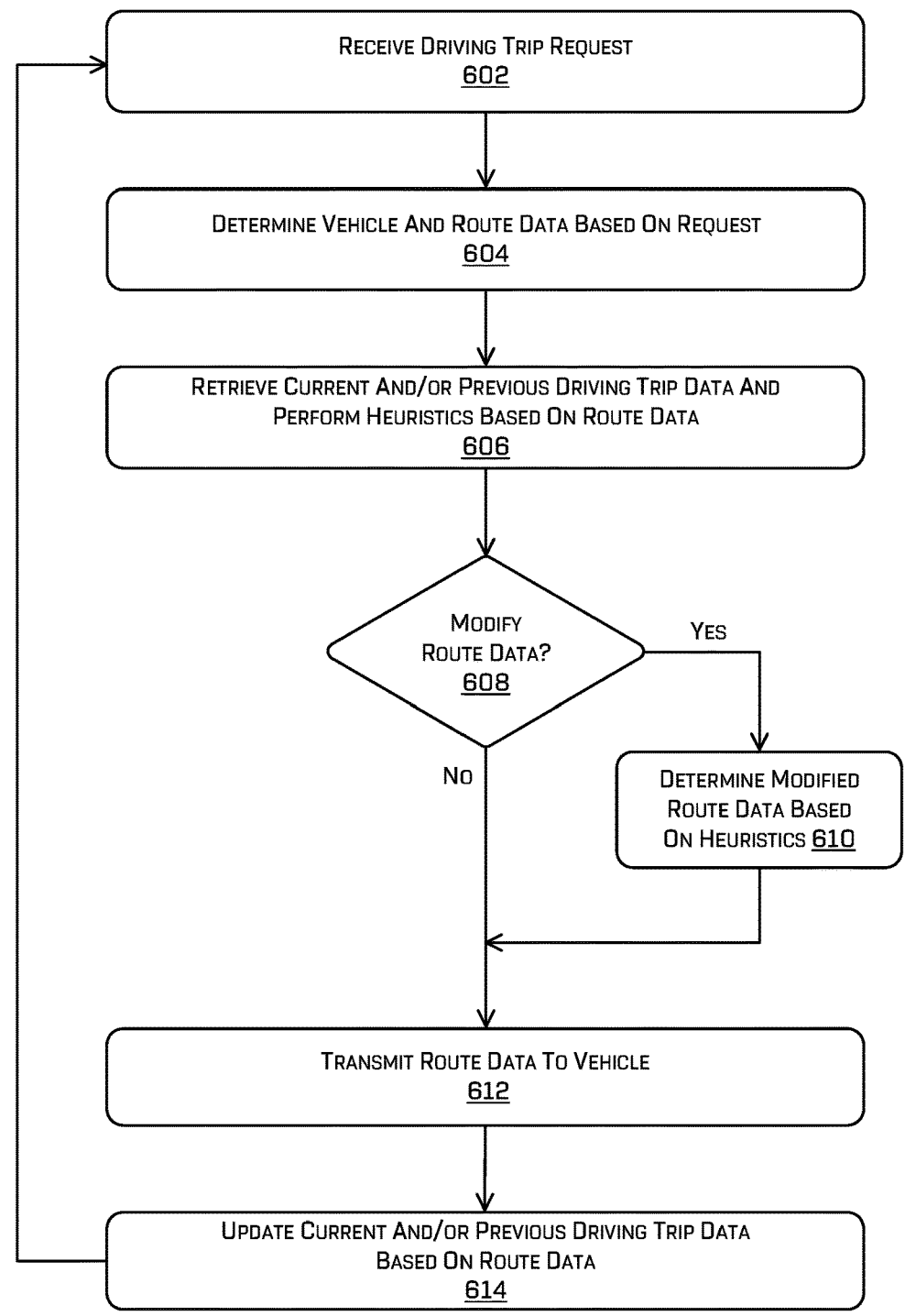
FIG. 6 is a flow diagram illustrating an example process for determining route data for a vehicle in a fleet, based on the current and previous driving trips performed by the vehicles in the fleet, in accordance with one or more examples of the disclosure.

FIG. 6 is a flow diagram illustrating an example process 600 for determining route data for a vehicle in a fleet assigned to perform a driving trip, based on current and/or previous driving routes determined for (and/or performed by) the vehicles in the fleet. As described herein, the operations of process 600 may be performed by a fleet routing system 102 (and/or the additional related components or subcomponents) described above in reference to FIGS. 1-5. In various examples, some or all of the operations of process 600 can be performed by a planning component 128 of a vehicle 104, in addition or instead of the operations being performed on a separate fleet routing system 102.

At operation 602, the fleet routing system 102 may receive a driving trip request from a user associated with a vehicle fleet service. As described above, the driving trip request received in operation 602 may include a ride-hailing requests from a user of ride-hailing service, an item delivery requests from a shipper or recipient, etc. The driving trip requests received by the fleet routing system 102 may include, for example, the one or more destinations (or locations) associated with the requested trip (e.g., pick-up destinations, drop-off destinations, intermediate waypoints, etc.), corresponding times, various requested vehicle characteristics or features (e.g., vehicle size, type, number of seats, etc.), and/or data based on the passengers or items associated with the request.

At operation 604, the fleet routing system 102 may, in response to receiving the driving trip request, determine a vehicle in the fleet to assign the driving trip, and may determine route data based on the driving trip request. The route data determined in operation 604 may represent initial (or unmodified) route data based on the driving trip request. Such initial route data may include, for example, the destinations provided by the user within the driving trip request, corresponding pick-up and drop-off times, passenger or item information, etc.

At operation 606, the fleet routing system 102 may perform various analyses, using the techniques described herein, to determine whether or not the initial route data determined in operation 604 is to be modified. For example, using the current route heuristics component 118, the fleet routing system 102 may be configured to analyze the driving trips currently being performed by the other vehicles in the fleet, and based on the analyses, may determine that a destination of the requested driving trip may be full or overcrowded, and/or that a potential road segment of the requested driving trip may be congested. Additionally, the previous (or historical) route heuristics component 120 may be configured to analyze the driving trips previously performed by the fleet, and based on the analyses, may determine patterns among the previous driving routes (e.g., patterns of congestion, non-uniformity, etc.). In such cases, the fleet routing system 102 may determine modifications to the initial route data, in order to avoid routing the vehicle 104 to a crowded or congested destination (e.g., a full pullover location) or along a potentially congested driving route.

When the fleet routing system 102 determines that the route data for the requested driving trip should be modified based on the analysis of the current and/or previous driving trips performed by the fleet (608: Yes), then in operation 610 the fleet routing system 102 may perform the determined route data modifications. As described above, route data modifications may include modifying a destination of a requested driving trip (e.g., to a less crowded pullover location or alternative nearby destination), adding one or more additional waypoints to the route data (e.g., to influence the vehicle 104 to drive on particular road segments), adding one or more restricted regions to the route data (e.g., to influence the vehicle 104 to avoid on particular road segments), and/or adding one or more distribution regions to the route data (e.g., to influence the vehicle 104 increase route variation and non-uniformity within particular areas in the driving environment). As described above, in some examples, modifying the route data in operation 610 may include supplementing or modifying the map data provided the vehicle 104, supplementing or modifying the traffic data provided the vehicle 104, adding and/or changing road segment feature values (e.g., road segment traffic counters, road segment traversal costs, etc.), and the like.

In contrast, when the fleet routing system 102 determines that the route data for the requested driving trip should not be modified based on the analysis of the current and/or previous driving trips performed by the fleet (608: No), then the process may proceed to operation 612 with the initial route data. At operation 612, the fleet routing system 102 may transmit the route data for the requested driving trip, to the vehicle 104 assigned to perform the trip. As described above, based on the route data received from the fleet routing system 102 (e.g., including destinations, waypoints, times, restricted regions, etc.), the vehicle 104 may be configured to independently determine an optimal route to traverse the environment to perform the requested driving trip.

At operation 614, the fleet routing system 102 may update the current and/or previous driving trip data based on the route data provided to the vehicle 104. Such updates may allow the fleet routing system 102 to consider the route data for the current driving trip request when generating route data for subsequent driving trips. Additionally, in some cases, some or all of the vehicles in the fleet may transmit back to the fleet routing system 102 data representing the complete driving route determined and performed by the vehicle based on the route data. In such cases, the fleet routing system 102 may store this additional data for analysis, and use the data when generating route data for subsequent driving trips. Such data may enable the current route heuristics component 118 and/or previous route heuristics component 120 to identify with greater accuracy and confidence areas of overcrowding, congestion, and traffic non-uniformity on specific road segments and/or within particular map regions.

Figure 7:
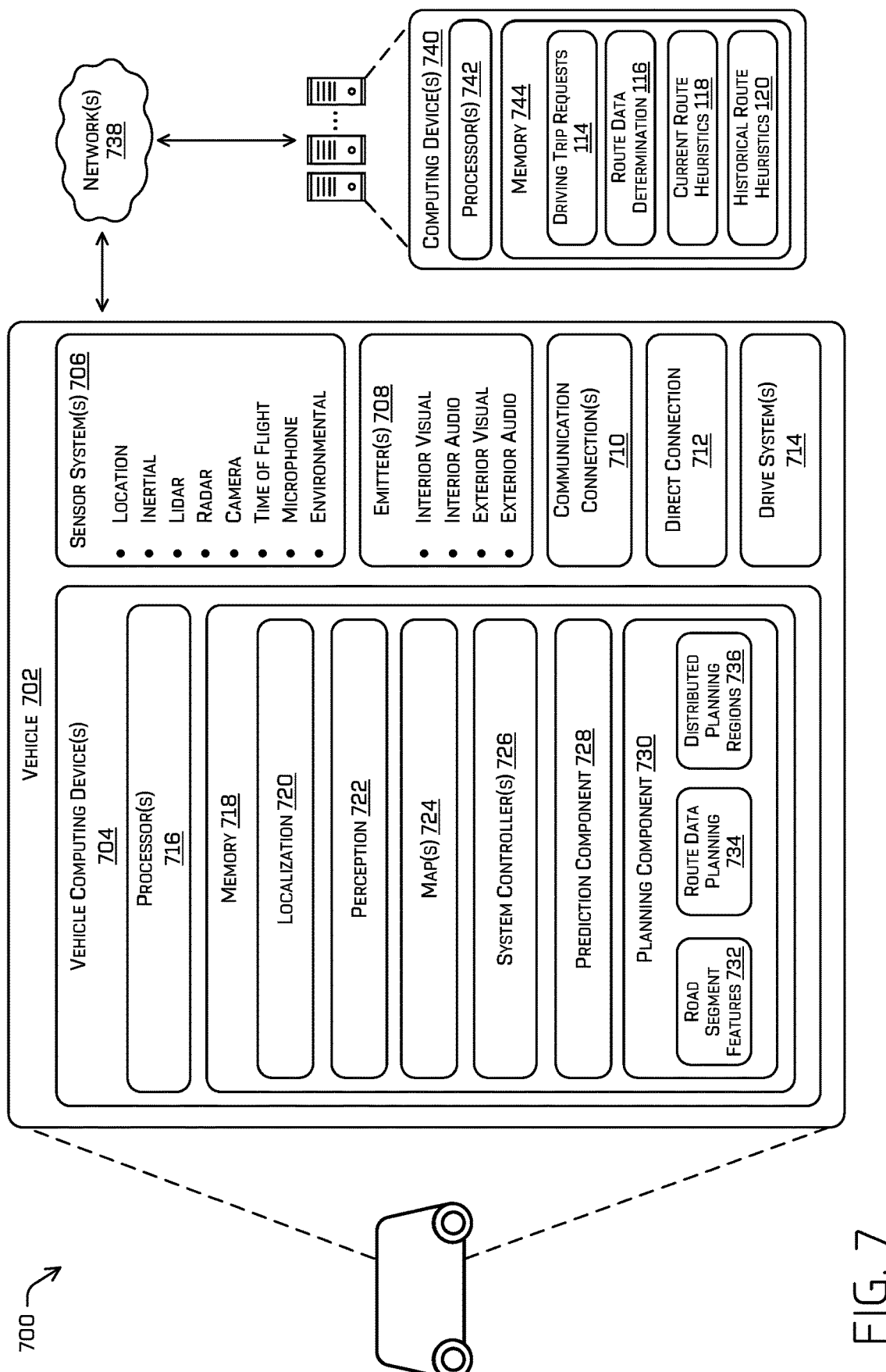
FIG. 7 depicts a block diagram of an example system for implementing various techniques described herein.

FIG. 7 depicts a block diagram of an example system 700 for implementing various techniques described herein. In some instances, the example system 700 may include a vehicle 702, which may represent the vehicle 104 discussed above in FIGS. 1-6, and one or more computing devices 740, which may represent the fleet routing system 102 discussed above. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 702 can be configured to perform various techniques described herein, including receiving route data 122 from the computing device(s) 740 based on requested driving trips, and determining driving routes based on the route data 122. Similarly, the computing device(s) 740 can be configured to perform various techniques of the fleet routing system 102 described herein, including modifying route data for vehicles in a fleet, based on the current and/or previous driving trips performed by the fleet.

The vehicle 702 may include vehicle computing device(s) 704, sensor(s) 706, emitter(s) 708, network interface(s) 710, at least one direct connection 712 (e.g., for physically coupling with the vehicle to exchange data and/or to provide power), and one or more drive system(s) 714. In this example, the vehicle 702 may correspond to vehicle 104 discussed above. The system 700 may additionally or alternatively comprise vehicle computing device(s) 704.

In some instances, the sensor(s) 706 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 740.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive systems(s) 714. Also, the network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 740. In some examples, computing device(s) 740 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 738. For example, the network interface(s) 710 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.)

or any suitable wired or wireless communications protocol that enables the respective computing device to interface with the other computing device(s). In some instances, the vehicle computing device(s) 704 and/or the sensor(s) 706 may send sensor data, via the network(s) 738, to the computing device(s) 740 at a particular frequency, after a lapse of a predetermined period of time, in near real-time, etc.

In some instances, the vehicle 702 may include one or more drive systems(s) 714 (or drive components). In some instances, the vehicle 702 may have a single drive system 714. In some instances, the drive system(s) 714 may include one or more sensors to detect conditions of the drive system(s) 714 and/or the surroundings of the vehicle 702. By way of example and not limitation, the sensor(s) of the drive systems(s) 714 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 714. In some cases, the sensor(s) on the drive systems(s) 714 may overlap or supplement corresponding systems of the vehicle 702 (e.g., sensor(s) 706).'

The drive systems(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 714 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 714. Furthermore, the drive systems(s) 714 may also include one or more communication connection(s) that enable communication by the respective drive component with one or more other local or remote computing device(s).

The vehicle computing device(s) 704 may include processor(s) 716 and memory 718 communicatively coupled with the one or more processors 716. Memory 718 may represent the memory of computing system(s) 112. Computing device(s) 740 may also include processor(s) 742, and/or memory 744. As described above, the memory 744 of the computing device(s) 740, which may be implemented as a fleet routing system 102, may store and execute a driving trip request component 114, a route data determination component 116, a current route heuristics component 118, and a previous route heuristics component 120, configured to perform any combination of functionalities of the fleet routing system 102 described herein.

The processor(s) 716 and/or 744 may be any suitable processor capable of executing instructions to process data and perform operations as described herein. By way of example and not limitation, the processor(s) 716 and/or 744 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 718 and/or 740 may be examples of non-transitory computer-readable media. The memory 718 and/or 740 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718 and/or memory 744 may store a localization component 720, perception component 722, maps 724, system controller(s) 726, prediction component 728, and/or planning component 730. As described in the various examples above, the maps 724 may include modified and/or supplemental map data (and/or traffic data) received from the route data determination component 116, such as data identifying particular regions (e.g., restricted regions, distribution regions, etc.) and/or road segment feature values representing traffic counters, costs, etc. Additionally, as described above, the planning component 730 may include data identifying road segment features 732 (e.g., road segment costs, traffic counter data, driving restrictions, etc.) defining restricted regions, distribution regions, and congestion locations, etc. The planning component also may include route planning data 734 received from the route data determination component 116, which may include any combination of the route data described herein, and/or a distributed planning component 736, which may be configured to control the vehicle 702 within distribution regions.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include map(s) of an environment and can continuously determine a location, velocity, and/or orientation of the autonomous vehicle within the map(s). In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the planning component 730 and/or to the prediction component 728, a location and/or orientation of the vehicle 702 relative to the environment and/or sensor data associated therewith.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 724 may include at least one map (e.g., images and/or a mesh) generated in accordance with the techniques discussed herein. In some examples, the vehicle 702 can be controlled based at least in part on the maps 724. That is, the maps 724 can be used in connection with the localization component 720, the perception component 722, and/or the planning component 730 to determine a location of the vehicle 702, identify objects in an environment, and/or generate routes and/or trajectories to navigate within an environment.

In some instances, the perception component 722 may comprise a primary perception system and/or a prediction system implemented in hardware and/or software. The perception component 722 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 722 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 728 may include functionality to generate predicted information associated with objects in an environment. As an example, the prediction component

728 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 728 can generate one or more predicted positions, predicted velocities, predicted trajectories, etc., for such target objects based on attributes of the target object and/or other objects proximate the target object.

The planning component 730 may receive a location and/or orientation of the vehicle 702 from the localization component 720, perception data from the perception component 722, and/or predicted trajectories from the prediction component 728, and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 726 and/or drive systems(s) 714 may parse/cause to be carried out, second instructions for the emitter(s) 708 may be formatted according to a second format associated therewith). In at least one example, the planning component 730 may comprise a nominal trajectory generation subcomponent that generates a set of candidate trajectories, and selects a trajectory for implementation by the drive systems(s) 714 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 718 and/or 740 may additionally or alternatively store a mapping system (e.g., generating a map based at least in part on sensor data), a planning system, a ride management system, etc. Although localization component 720, perception component 722, the prediction component 728, the planning component 730, and/or system controller(s) 726 are illustrated as being stored in memory 718, any of these components may include processor-executable instructions, machine-learned model(s) (e.g., a neural network), and/or hardware and all or part of any of these components may be stored on memory 744 or configured as part of computing device(s) 740.

As described herein, the localization component 720, the perception component 722, the prediction component 728, the planning component 730, and/or other components of the system 700 may comprise one or more ML models. For example, the localization component 720, the perception component 722, the prediction component 728, and/or the planning component 730 may each comprise different ML model pipelines. The prediction component 728 may use a different ML model or a combination of different ML models in different circumstances. For example, the prediction component 728 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 718 may additionally or alternatively store one or more system controller(s) 726, which may be configured to control steering, propulsion, braking, safety, emitters, communication, and other systems of the vehicle 702. These system controller(s) 726 may communicate with and/or control corresponding systems of the drive systems(s) 714 and/or other components of the vehicle 702.

In an additional or alternate example, vehicle 702 and/or computing device(s) 740 may communicate (e.g., transmit and/or receive messages over network(s) 738) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 702. For example, the passenger device may additionally or alternatively comprise a display and/or one or more input/output devices, such as a touchscreen, microphone, speaker, and/or the like. In some examples, the vehicle 702 may transmit messages and/or receive messages from the passenger device.

It should be noted that while FIG. 7 is illustrated as a distributed system, in alternative examples, components of the vehicle 702 may be associated with the computing device(s) 740 and/or components of the computing device(s) 740 may be associated with the vehicle 702. That is, the vehicle 702 may perform one or more of the functions associated with the computing device(s) 740, and vice versa.

EXAMPLE CLAUSES

A. A system comprising: one or more processors; and one or more non-transitory computer-readable media storing computer-executable instructions that, when executed, cause the one or more processors to perform operations comprising: receiving a first request for a first driving trip, the first request including a first destination in an environment; determining, based at least in part on the first destination, first route data for the first driving trip; providing the first route data to a first vehicle of a vehicle fleet, wherein the first vehicle is configured to determine a first driving route based at least in part on the first route data; receiving a second request for a second driving trip, the second request including a second destination in the environment; determining, based at least in part on the second destination, second route data for the second driving trip; determining a cost value associated with a location in the environment, based at least in part on the first route data or data associated with the first driving route determined by the first vehicle; determining modified second route data, based at least in part on the cost value associated with the location, wherein determining the modified second route data includes at least one of: determining a modified second destination for the second driving trip; determining an additional waypoint for the second driving trip; or determining a restricted region within map data for the second driving trip; and providing the modified second route data to a second vehicle of the vehicle fleet, wherein the second vehicle is configured to determine a second driving route based at least in part on the modified second route data.

B. The system of paragraph A, wherein determining the second route data comprises: determining a first time period during which the first vehicle is scheduled to be at a first location during the first driving trip; determining a second time period during which the second vehicle is scheduled to be at the first location during the second driving trip; and determining the second route data based at least in part on determining that the first time period and second time period overlap.

C. The system of paragraph A, wherein: the first destination and the second destination correspond to a common destination, determining the first route data includes determining a first pullover location associated with the common destination, and determining the modified second route data includes determining a second pullover location associated with the common destination, different from the first pullover location.

D. The system of paragraph A, wherein determining the modified second route data comprises: determining a size of a pullover location associated with the second destination; determining, for the vehicle fleet, a number of current driving trips associated with the second destination; and determining the modified second destination, based at least in part on the size of the pullover location, and the number of current driving trips associated with the second destination.

E. The system of paragraph A, the operations further comprising: after providing the first route data to the first vehicle, receiving data representing a first driving route determined by the first vehicle; and updating a feature value of a road segment, based at least in part on the first driving route determined by the first vehicle, to obtain an updated feature value of the road segment, wherein the modified second route data includes the updated feature value of the road segment.

F. A method comprising: receiving a first destination associated with a first driving trip; determining, based at least in part on the first destination, first route data for the first driving trip; providing the first route data to a first vehicle configured to determine a first driving route based at least in part on the first route data; receiving a second destination associated with a second driving trip; determining second route data for the second driving trip, wherein determining the second route data is based at least in part on the second destination and at least one of: the first route data; or data associated with the first driving route determined by the first vehicle; and providing the second route data to a second vehicle configured to determine a second driving route based at least in part on the second route data.

G. The method of paragraph F, wherein determining the second route data includes determining a modified second destination, based at least in part on determining that the first destination and the second destination correspond to a same destination.

H. The method of paragraph F, wherein determining the second route data comprises: determining a first time period during which the first vehicle is scheduled to be at a first location during the first driving trip; determining a second time period during which the second vehicle is scheduled to be at the first location during the second driving trip; and determining the second route data, based at least in part on determining that the first time period and second time period overlap.

I. The method of paragraph F, wherein: the first destination and the second destination correspond to a common destination, determining the first route data includes determining a first pullover location associated with the common destination, and determining the second route data includes determining a second pullover location associated with the common destination, different from the first pullover location.

J. The method of paragraph F, wherein determining the second route data comprises: determining a size of a pullover location associated with the second destination; determining, for a vehicle fleet associated with the second vehicle, a number of current driving trips associated with the second destination; and determining a modified second destination, based at least in part on the size of the pullover location, and the number of current driving trips associated with the second destination.

K. The method of paragraph F, wherein determining the second route data comprises determining, based at least in part on the first route data, at least one of: an additional waypoint for the second driving trip; a restricted region within map data associated with the second driving trip; or a modified cost value associated with a road segment in the map data.

L. The method of paragraph F, wherein determining the second route data includes determining, within map data associated with the second driving trip, a set of associated alternative road segments.

M. The method of paragraph F, further comprising: after providing the first route data to the first vehicle, receiving data associated with a first driving route determined by the first vehicle; and updating a feature value of a road segment, based at least in part on the data associated with the first driving route determined by the first vehicle, to obtain an updated feature value of the road segment, wherein the second route data includes the updated feature value of the road segment.

N. One or more non transitory computer readable media storing instructions executable by a processor, wherein the instructions, when executed, cause the processor to perform operations comprising: receiving a first destination associated with a first driving trip; determining, based at least in part on the first destination, first route data for the first driving trip; providing the first route data to a first vehicle configured to determine a first driving route based at least in part on the first route data; receiving a second destination associated with a second driving trip; determining second route data for the second driving trip, wherein determining the second route data is based at least in part on the second destination and at least one of: the first route data; or data associated with the first driving route determined by the first vehicle; and providing the second route data to a second vehicle configured to determine a second driving route based at least in part on the second route data.

O. The one or more non transitory computer readable media of paragraph N, wherein determining the second route data includes determining a modified second destination, based at least in part on determining that the first destination and the second destination correspond to a same destination.

P. The one or more non transitory computer readable media of paragraph N, wherein determining the second route data comprises: determining a first time period during which the first vehicle is scheduled to be at a first location during the first driving trip; determining a second time period during which the second vehicle is scheduled to be at the first location during the second driving trip; and determining the second route data, based at least in part on determining that the first time period and second time period overlap.

Q. The one or more non transitory computer readable media of paragraph N, wherein: the first destination and the second destination correspond to a common destination, determining the first route data includes determining a first pullover location associated with the common destination, and determining the second route data includes determining a second pullover location associated with the common destination, different from the first pullover location.

R. The one or more non transitory computer readable media of paragraph N, wherein determining the second route data comprises: determining a size of a pullover location associated with the second destination; determining, for a vehicle fleet associated with the second vehicle, a number of current driving trips associated with the second destination; and determining a modified second destination, based at least in part on the size of the pullover location, and the number of current driving trips associated with the second destination.

S. The one or more non transitory computer readable media of paragraph N, wherein determining the second route data comprises determining, based at least in part on the first route data, at least one of: an additional waypoint for the second driving trip; a restricted region within map data associated with the second driving trip; or a modified cost value associated with a road segment in the map data.

T. The one or more non transitory computer readable media of paragraph N, the operations further comprising: after providing the first route data to the first vehicle, receiving data representing a first driving route determined by the first vehicle; and updating a feature value of a road segment, based at least in part on the first driving route determined by the first vehicle, to obtain an updated feature value of the road segment, wherein the second route data includes the updated feature value of the road segment.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A fleet routing system for autonomous vehicles comprising:

one or more processors; and one or more non-transitory computer-readable media storing computer-executable instructions that, when executed, cause the one or more processors to perform operations comprising:

determining a first driving route associated with a first driving trip of a first vehicle in an environment, the first driving route including a first starting point and a first destination;

determining a characteristic of a pullover location associated with the first starting point or the first destination;

receiving trip data associated with a request for a requested driving trip, the trip data including a second starting point and a second destination in the environment;

determining modified trip data associated with the requested driving trip, based at least in part on:

determining that either the second starting point or the second destination is associated with the pullover location; and determining that there is a time overlap between the first driving trip and the requested driving trip, wherein the fleeting routing system determines the modified trip data based at least in part on the characteristic of the pullover location; and providing, by the fleet routing system, the modified trip data to a second vehicle, wherein the second vehicle is configured to:

determine a second driving route based at least in part on the modified trip data; and control the second vehicle to perform the second driving route.

2. The fleet routing system of claim 1, wherein determining the modified trip data comprises:

determining a first time period during which the first vehicle is scheduled to be driving on a first road segment during the first driving trip;

determining a second time period during which the second vehicle is scheduled to be driving on the first road segment during the requested driving trip; and determining a weight associated with the first road segment, based at least in part on determining that the first time period and the second time period overlap.

3. The fleet routing system of claim 1, wherein:

determining the first driving route includes determining a first pullover space at the pullover location, and the operations further comprising determining a second pullover space at the pullover location for the requested driving trip, wherein the second pullover space is different from the first pullover space.

4. The fleet routing system of claim 1, the operations further comprising:

determining a size of the pullover location;

determining, for a vehicle fleet associated with the second vehicle, a number of current driving trips associated with the pullover location; and determining a modified destination for the requested driving trip, based at least in part on the size of the pullover location, and the number of current driving trips associated with the pullover location.

5. The fleet routing system of claim 1, the operations further comprising:

receiving, by the fleet routing system, data associated with the first driving route, the data determined by the first vehicle while driving the first driving route;

determining a weight associated with a road segment, based at least in part on the data associated with the first driving route determined by the first vehicle; and determining the modified trip data associated with the requested driving trip based at least in part on the weight associated with the road segment.

6. A method comprising:

determining, by a fleet routing system, a first driving route associated with a first driving trip of a first vehicle, the first driving route including a first starting point and a first destination;

determining, by the fleet routing system, a characteristic of a pullover location associated with the first starting point or the first destination;

receiving, by the fleet routing system, trip data associated with a requested driving trip, the trip data including a second starting point and a second destination associated with the requested driving trip;

determining modified trip data associated with the requested driving trip, based at least in part on:

determining that either the second starting point or the second destination is associated with the pullover location; and determining that there is a time overlap between the first driving trip and the requested driving trip, wherein the fleeting routing system determines the modified trip data based at least in part on the characteristic of the pullover location;

providing, by the fleet routing system, the modified trip data to a second vehicle, wherein the second vehicle is configured to:
   determine a second driving route based at least in part on the modified trip data; and
   control the second vehicle to perform the second driving route.

7. The method of claim 6, wherein determining the modified trip data comprises:
   determining a first time period during which the first vehicle is scheduled to be driving on a first road segment during the first driving trip;
   determining a second time period during which the second vehicle is scheduled to be driving on the first road segment during the requested driving trip; and
   determining a weight associated with the first road segment, based at least in part on determining that the first time period and the second time period overlap.

8. The method of claim 6, wherein:
   determining the first driving route includes determining a first pullover space at the pullover location, and
   the method further comprising determining a second pullover space at the pullover location for the requested driving trip, wherein the second pullover space is different from the first pullover space.

9. The method of claim 6, further comprising:
   determining a size of the pullover location;
   determining, for a vehicle fleet associated with the second vehicle, a number of current driving trips associated with the pullover location; and
   determining a modified destination for the requested driving trip, based at least in part on the size of the pullover location, and the number of current driving trips associated with the pullover location.

10. The method of claim 6, wherein determining the modified trip data comprises determining, based at least in part on the first driving route, at least one of:
   an additional waypoint for the requested driving trip; or
   a restricted region within map data associated with the requested driving trip.

11. The method of claim 6, further comprising determining, within map data associated with the requested driving trip, a set of associated alternative road segments.

12. The method of claim 6, further comprising:
   receiving, by the fleet routing system, data associated with the first driving route, the data determined by the first vehicle while driving the first driving route;
   determining a weight associated with a road segment, based at least in part on the data associated with the first driving route determined by the first vehicle; and
   determining the modified trip data associated with the requested driving trip based at least in part on the weight associated with the road segment.

13. One or more non-transitory computer-readable media storing instructions executable by a processor, wherein the instructions, when executed, cause the processor to perform operations comprising:
   determining, by a fleet routing system, a first driving route associated with a first driving trip of a first vehicle, the first driving route including a first starting point and a first destination;
   determining, by the fleet routing system, a characteristic of a pullover location associated with the first starting point or the first destination;
   receiving, by the fleet routing system, trip data associated with a requested driving trip, the trip data including a second starting point and a second destination associated with the requested driving trip;

determining modified trip data associated with the requested driving trip, based at least in part on:
      determining that either the second starting point or the second destination is associated with the pullover location; and
      determining that there is a time overlap between the first driving trip and the requested driving trip,
      wherein the fleeting routing system determines the modified trip data based at least in part on the characteristic of the pullover location;
   providing, by the fleet routing system, the modified trip data to a second vehicle,
   wherein the second vehicle is configured to:
      determine a second driving route based at least in part on the modified trip data; and
      control the second vehicle to perform the second driving route.

14. The one or more non-transitory computer-readable media of claim 13, wherein determining the modified trip data comprises:
   determining a first time period during which the first vehicle is scheduled to be driving on a first road segment during the first driving trip;
   determining a second time period during which the second vehicle is scheduled to be driving on the first road segment during the requested driving trip; and
   determining a weight associated with the first road segment, based at least in part on determining that the first time period and the second time period overlap.

15. The one or more non-transitory computer-readable media of claim 13, wherein:
   determining the first driving route includes determining a first pullover space at the pullover location, and
   the operations further comprising determining a second pullover space at the pullover location for the requested driving trip, wherein the second pullover space is different from the first pullover space.

16. The one or more non-transitory computer-readable media of claim 13, the operations further comprising:
   determining a size of the pullover location;
   determining, for a vehicle fleet associated with the second vehicle, a number of current driving trips associated with the pullover location; and
   determining a modified destination for the requested driving trip, based at least in part on the size of the pullover location, and the number of current driving trips associated with the pullover location.

17. The one or more non-transitory computer-readable media of claim 13, wherein determining the modified trip data comprises determining, based at least in part on the first driving route, at least one of:
   an additional waypoint for the requested driving trip; or
   a restricted region within map data associated with the requested driving trip.

18. The one or more non-transitory computer-readable media of claim 13, the operations further comprising:
   receiving, by the fleet routing system, data associated with the first driving route, the data determined by the first vehicle while driving the first driving route;
   determining a weight associated with a road segment, based at least in part on the data associated with the first driving route determined by the first vehicle; and
   determining the modified trip data associated with the requested driving trip based at least in part on the weight associated with the road segment.

* * * * *